United States Patent
Suda et al.

(10) Patent No.: US 6,647,002 B1
(45) Date of Patent: Nov. 11, 2003

(54) SYSTEM AND METHOD FOR CODE DIVISION MULTIPLE ACCESS COMMUNICATION, AND BASE STATION AND TERMINAL APPARATUS FOR SAME SYSTEM

(75) Inventors: Kenji Suda, Kawasaki (JP); Kazuo Kawabata, Kawasaki (JP); Kazuhisa Obuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/351,197

(22) Filed: Jul. 9, 1999

(30) Foreign Application Priority Data

Aug. 18, 1998 (JP) .......................................... 10-232163

(51) Int. Cl.$^7$ ............................................. H04B 7/216
(52) U.S. Cl. ..................... 370/335; 370/342; 370/322; 370/348; 370/443
(58) Field of Search ................................ 370/321, 322, 370/346, 347, 348, 443, 449, 335, 342

(56) References Cited

U.S. PATENT DOCUMENTS 5,594,738 A * 1/1997 Crisler et al. ................ 370/347
5,828,662 A * 10/1998 Jalali et al. .................. 370/335
5,841,777 A * 11/1998 Cohen ......................... 370/443
6,469,991 B1 * 10/2002 Chuah ...................... 370/347 X
2001/0033559 A1 * 10/2001 Masui et al. ............. 370/348 X

* cited by examiner

Primary Examiner—Nay Maung
Assistant Examiner—Philip J. Sobutka
(74) Attorney, Agent, or Firm—Katten Muchin Zavis Rosenman

(57) ABSTRACT

In a code division multiple access communicating system, a base station has a receiving means receiving access signals from plural terminal apparatus, and an acknowledge information transmitting means collectively putting acknowledge information to reception of the access signals for the terminal apparatus in a transmission frame when the receiving means receives the access signals from the terminal apparatus and transmitting the frame to the plural terminal apparatus, while each of the terminal apparatus has an acknowledge information receiving means receiving a plural pieces of acknowledge information from the acknowledge information transmitting means of the base station, and a transmitting means again accessing to the base station according to the acknowledge information for its own terminal apparatus among the plural pieces of acknowledge information, thereby avoiding conflict of access timings between the terminal apparatus whose acknowledge information has been put, and thus suppressing a decrease of the throughput.

29 Claims, 24 Drawing Sheets

- Mo : ACK MODE
- D : DUMMY
- NA : THE NUMBER OF PUT ACKs
- PID (PACKET ID): ACK INFORMATION

- U/C, USER / CONTROL INFORMATION
- TN : TERMINATING NODE INFORMATION
- W : CONTINUATION BITS
- S : SEQUENCE NUMBER
- PID : PACKET ID

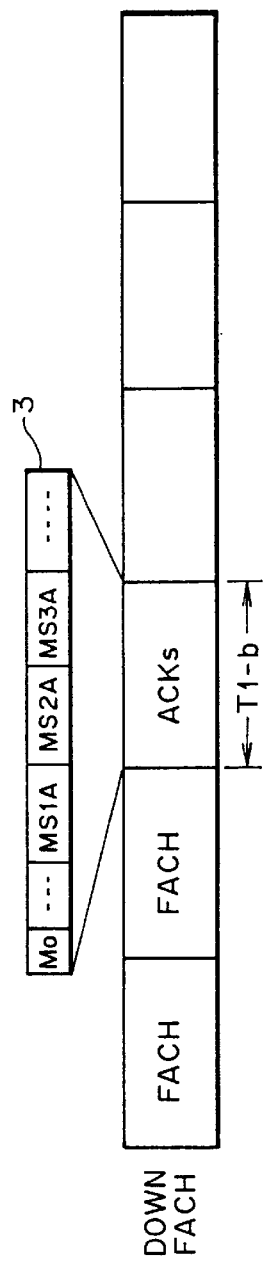
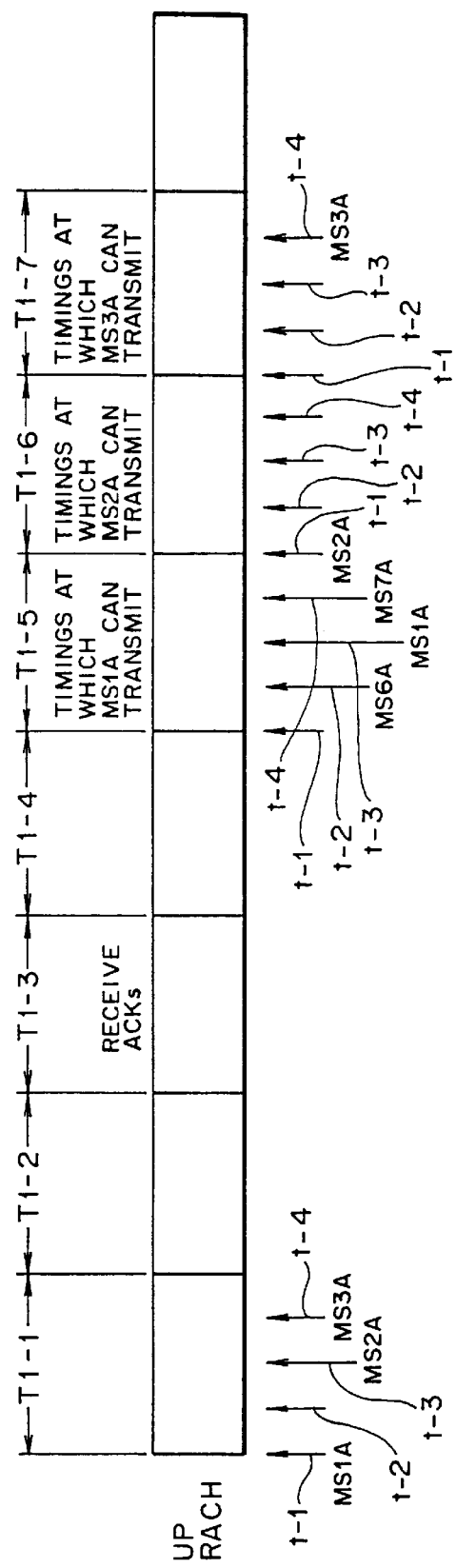
FIG. 9(a)
FIG. 9(b)

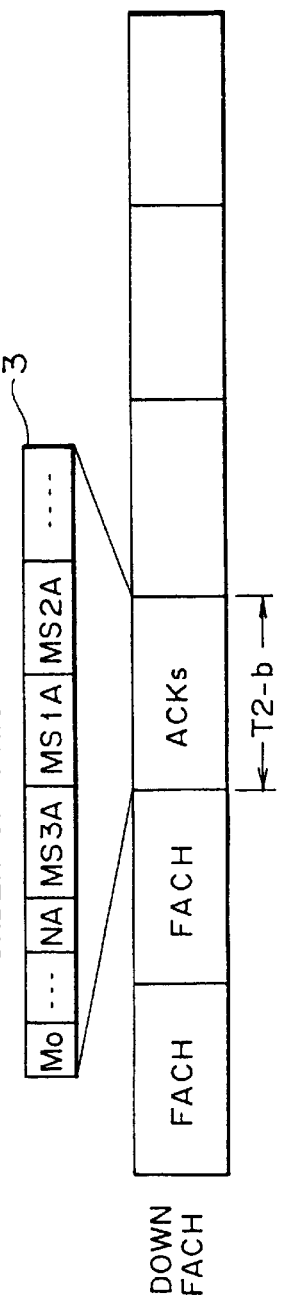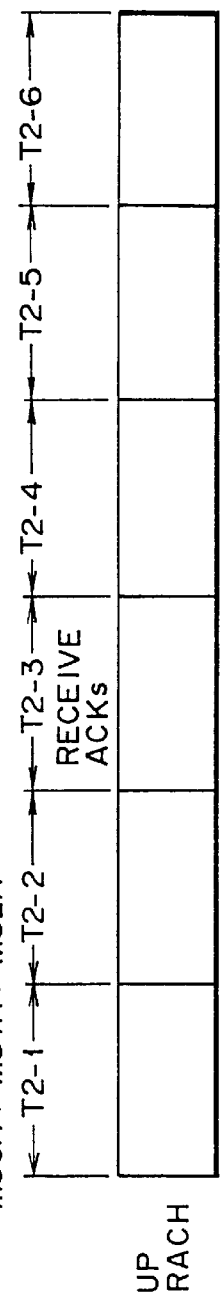
FIG. 11(a)
FIG. 11(b)

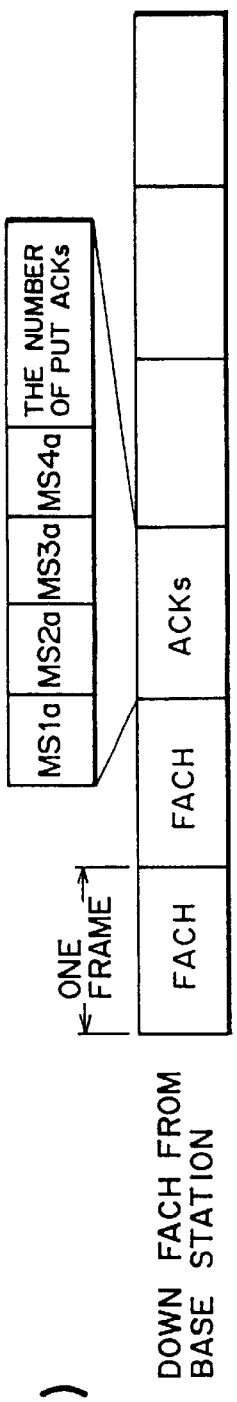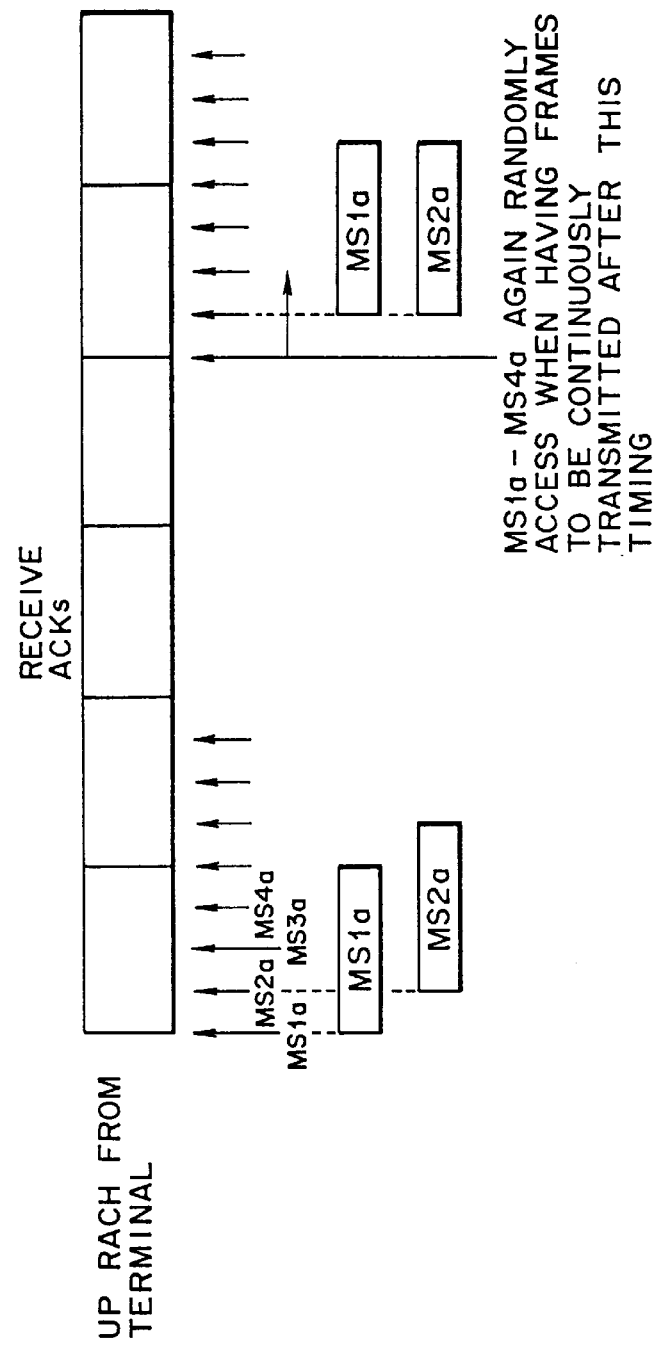
FIG. 24(a)
FIG. 24(b)

SYSTEM AND METHOD FOR CODE DIVISION MULTIPLE ACCESS COMMUNICATION, AND BASE STATION AND TERMINAL APPARATUS FOR SAME SYSTEM

BACKGROUND OF THE INVENTION (1) Field of the Invention

The present invention relates to a code division multiple access communicating system, a base station for a code division multiple access communicating system and a terminal apparatus for a code division multiple access communicating system, and a code division multiple access communicating method, suitable for a communication of spread spectrum information with a base station over a commonly used channel.

(2) Description of Related Art

With an increase of demand for portable telephones, efficient use of a frequency becomes a serious problem in a mobile communication system. In such circumstances, a code division multiple access (CDMA) communicating system using a spread spectrum technique draws attention as a system having a high frequency efficiency, searches on it being vital for the purpose of practical application thereof.

In a CDMA communicating system, the user uses a mobile station (hereinafter referred to as MS) to transmit a frame to a base station (hereinafter referred to as BS) at a transmittable timing according to notice information transmitted from the BS when making a telephone call, for example.

A frame transmitted from a portable telephone to a BS is transmitted at a timing in a predetermined cycle, as shown by a plurality of arrows in FIG. 24(b). In FIG. 24(b), there are, for example, four timings that the portable telephone can access to the BS in one cycle. Each portable telephone randomly selects any one of the timings to transmit a frame to the BS.

FIG. 24(b) shows that MSs 1a through 4a transmit frames to the BS at different timings. Incidentally, frames transmitted from the MSs 1a through 4a are spread using a spreading code and transmitted to the BS. The MSs 1a through 4a transmit frames at different timings, so that a timing of a phase of the spreading code shifts with a transmit timing even if the spreading code used by MSs 1a through 4a has the same system. The BS can thereby de-spread each of the frames transmitted from the MSs 1a through 4a on the basis of the spreading code having a phase different from one another so as to extract the frame.

When the BS receives frames transmitted from the MSs 1a through 4a, the BS transmits ACKs (Acknowledge) as acknowledge information to the MSs 1a through 4a (transmitting side), as shown in FIG. 24(a). In ACKs, plural pieces of acknowledge information for the MS 1a through 4a are collected in a transmission frame, and transmitted.

Each of the MSs 1a through 4a receives a frame outputted from the BS after transmitting the frame to confirm whether or not the frame having been transmitted to the BS is received by the BS. When there is acknowledge information to the frame having been transmitted from itself in the received frame, each of the MSs 1a through 4a confirms reception of the frame having been transmitted to the BS by the BS. When each of the MSs 1a through 4a does not receive acknowledge information to the frame having been transmitted from itself within a predetermined period after transmitting the frame to the BS, the MS performs a re-transmitting process. When receiving ACK to the information having been transmitted from itself within a predetermined period after transmitting the frame to the BS, each of the MSs 1a through 4a transmits a remaining frame when having the remaining frame to be continuously transmitted to the BS.

When transmitting a plurality of frames to the BS, each of the MSs 1a through 4a recevies ACK each time the MS transmits a frame, then transmits a remaining frame.

In the case where each of the MSs 1a through 4a transmits one frame, receives ACK shown in FIG. 24(a), and the MS 1a and MS 2a transmit remaining packets as shown in FIG. 24(b), each of the MS 1a and the MS 2a possibly access to the BS at the same timing since each of the MS 1a and the MS 2a can randomly select an access timing among four access timings in one frame.

At this time, information transmitted from the MS 1a and the MS 2a is spread using the spreading code having the same phase, so that the BS cannot separate the information transmitted from the MS 1a and the MS 2a, hence the information is lost. The MS 1a and the MS 2a therefore cannot receive acknowledge information to the frames that the MS 1a and the MS 2a have secondary transmitted to the BS, thus the MSs 1a and 2a have to perform the re-transmitting process. This leads to a decrease of a throughput of the communicating system.

SUMMARY OF THE INVENTION

In the light of the above disadvantage, an object of the present invention is to provide a code division multiple access communicating system, a base station for a code division multiple access communicating system and a terminal apparatus for a code division multiple access communicating system, and a code division multiple access communicating method, in which when a terminal apparatus continuously transmits remaining information after receiving acknowledge information from a base station, the terminal apparatus again accesses to the base station according to an order of a piece of acknowledge information for itself among plural pieces of acknowledge information having been put in a transmission frame, whereby conflict of access timings between terminal apparatus whose acknowledge information has been put in the transmission frame is avoided, thus a decrease of the throughput can be suppressed.

A code division multiple access communicating system according to this invention comprises a base station and a plurality of terminal apparatus exchanging spread spectrum information with the base station over a commonly used channel when communicating with the base station.

The base station comprises a receiving means for receiving an access signal from each of the plural terminal apparatus at the time of random access from each of the plural terminal apparatus, and an acknowledge information transmitting means for collectively putting plural pieces of acknowledge information to reception of the access signals for the plural terminal apparatus in a transmission frame, and transmitting the frame to the plural terminal apparatus when receiving means receives the access signals from the plural terminal apparatus.

Each of the plural terminal apparatus comprises an acknowledge information receiving means for receiving the plural pieces of acknowledge information from the acknowledge information transmitting means of the base station, and a transmitting means for again accessing to the base station according to an order of acknowledge information for its own terminal apparatus among the plural pieces of acknowledge information received from the base station by the acknowledge information receiving means was put after randomly accessing to the base station when there is remaining information to be continuously transmitted to the base station, and transmitting the remaining information.

In the code division multiple access communicating system of this invention, the terminal apparatus again accesses to the base station according to an order of acknowledge information for itself among plural pieces of acknowledge information received from the base station by the acknowledge information receiving means to transmit remaining information, whereby conflict between the terminal apparatus transmitting remaining information is avoided and a decrease of the throughput is suppressed.

A base station for a code division multiple access communicating system of this invention comprises a receiving means for receiving an access signal from each of a plurality of terminal apparatus at the time of random access from each of the plural terminal apparatus, and an acknowledge information transmitting means for collectively putting plural pieces of acknowledge information to reception of the access signals for the plural terminal apparatus in a transmission frame in the order the access signals were received from the plural terminal apparatus when receiving the access signals from the plural terminal apparatus by the receiving means, and transmitting the transmission frame to the plural terminal apparatus so that the plural terminal apparatus having remaining information to be continuously transmitted to the base station again access to the base station in a predetermined order to transmit the remaining information.

Accordingly, the base station for a code division multiple access communicating system of this invention collectively puts plural pieces of acknowledge information for a plurality of terminal apparatus in a transmission frame in the order the base station received access signals from the plural terminal apparatus and transmits the transmission frame to the plural terminal apparatus so that the plural terminal apparatus having remaining information to be continuously transmitted to the base station again accesses to the base station in a predetermined order, whereby conflict between terminal apparatus transmitting remaining information is avoided, and a decrease of the throughput is thus suppressed.

A terminal apparatus for a code division multiple access communicating system of this invention comprises a randomly accessing means for randomly accessing to a base station, an acknowledge information receiving means for receiving plural pieces of acknowledge information from the base station, the base station collectively putting acknowledge information for the terminal apparatus along with acknowledge information for other terminal apparatus in a transmission frame, and transmitting the transmission frame to the terminal apparatus when receiving an access signal from the terminal apparatus at the time of random access by the terminal apparatus to the base station, and a transmitting means for again accessing to the base station according to an order of the order acknowledge information for the terminal apparatus of its own among the plural pieces of acknowledge information received from the base station by the acknowledge information receiving means after the terminal apparatus randomly accesses to the base station if there is remaining information to be continuously transmitted to the base station, and transmitting the remaining information.

Accordingly, in the terminal apparatus for a code division multiple access communicating system of this invention, the transmitting means again accesses to the base station according to an order of acknowledge information for a terminal apparatus of its own among plural pieces of acknowledge information received from the base station by the acknowledge information receiving means after randomly accessing to the base station, whereby conflict between terminal apparatus transmitting remaining information, and a decrease of the throughput is thus suppressed.

A code division multiple access communicating method of this invention comprises the steps of an acknowledge information transmitting step performed in a base station of collectively putting acknowledge information for a plurality of terminal apparatus in a transmission frame when the base station receives access signals from the plural terminal apparatus at the time of random access from the plural terminal apparatus, and transmitting the transmission frame to the plural terminal apparatus, and a transmitting step performed in each of the plural terminal apparatus of again accessing to the base station according to an order of acknowledge information for itself among the plural pieces of acknowledge information received from the base station in the transmission frame after a random access to the base station if there is remaining information to be continuously transmitted to the base station to transmit the remaining information.

According to the code division multiple access communicating method of this invention, each of a plurality of the terminal apparatus again accesses to the base station according to an order of acknowledge information for itself among plural pieces of acknowledge information received from the base station if having remaining information to be continuously transmitted to the base station after randomly accessing to the base station to transmit the remaining information at the transmitting step, whereby conflict between terminal apparatus transmitting remaining information is avoided, and a decrease of the throughput is thus suppressed.

BRIEF DESCRIPTION OF THE DRAWINGS

FIGS. 9(a) and 9(b) are time charts illustrating an operation of a CDMA communicating system according to a first modification of the first embodiment of this invention;

FIGS. 11(a) and 11(b) are time charts illustrating a CDMA communicating system according to a second modification of the first embodiment of this invention;

FIGS. 24(a) and 24(b) are time charts illustrating an operation of a CDMA communicating system.

Figure 1:
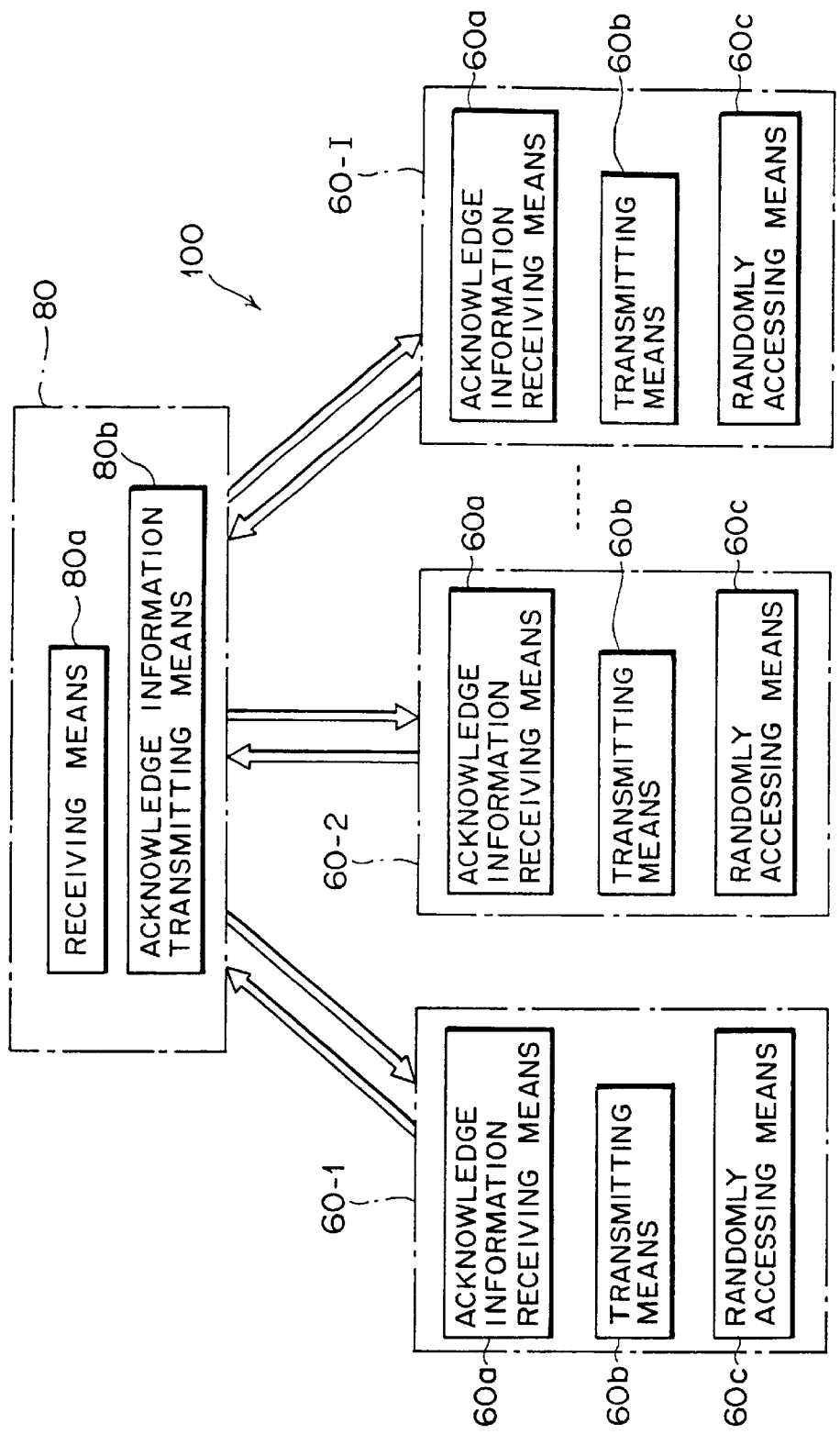
FIG. 1 is a block diagram showing an aspect of this invention.

DESCRIPTION OF THE PREFERRED EMBODIMENTS (a) Description of an Aspect of the Invention Now, description will be made of an aspect of the present invention with reference to the drawing.

As shown in FIG. 1, a code division multiple access communicating system 100 described in claim 1 comprises a base station 80, and a plurality of terminal apparatus 60-1 thorough 60-I (I: an integer not less than 2) exchanging spread spectrum information with the base station 80 over a commonly used channel when communicating with the base station 80.

The base station 80 comprises a receiving means 80a receiving access signals from the plural terminal apparatus 60-1 through 60-I at the time of random accesses from the terminal apparatus 60-1 through 60-I, and an acknowledge information transmitting means 80b putting plural pieces of acknowledge information to reception of the access signals in a transmission frame when the receiving means 80a receives the access signals from the terminal apparatus 60-1 through 60-I, and transmitting the transmission frame to the plural terminal apparatus 60-1 through 60-I.

Each of the terminal apparatus 60-1 through 60-I comprises an acknowledge information receiving means 60a receiving the plural pieces of acknowledge information from the acknowledge information transmitting means 80b of the base station 80, and a transmitting means 60b again accessing to the base station according to an order of a piece of acknowledge information for a terminal apparatus of its own among the plural pieces of acknowledge information received from the base station 80 by the acknowledge information receiving means 70a when the terminal apparatus has remaining information to be continuously transmitted to the base station 80 after randomly accessing to the base station 80.

According to the code division multiple access communicating system described in claim 1 of this invention, the terminal apparatus again accesses to the base station according to an order of a piece of acknowledge information for itself among plural pieces of acknowledge information received from the base station by the acknowledge information receiving means to transmit remaining information, whereby conflict between terminal apparatus transmitting remaining information is avoided, a decrease of the throughput is thus suppressed.

Hereinafter, embodiment of the present invention will be described with reference to the drawings.

(b1) Description of a First Embodiment

Figure 2:
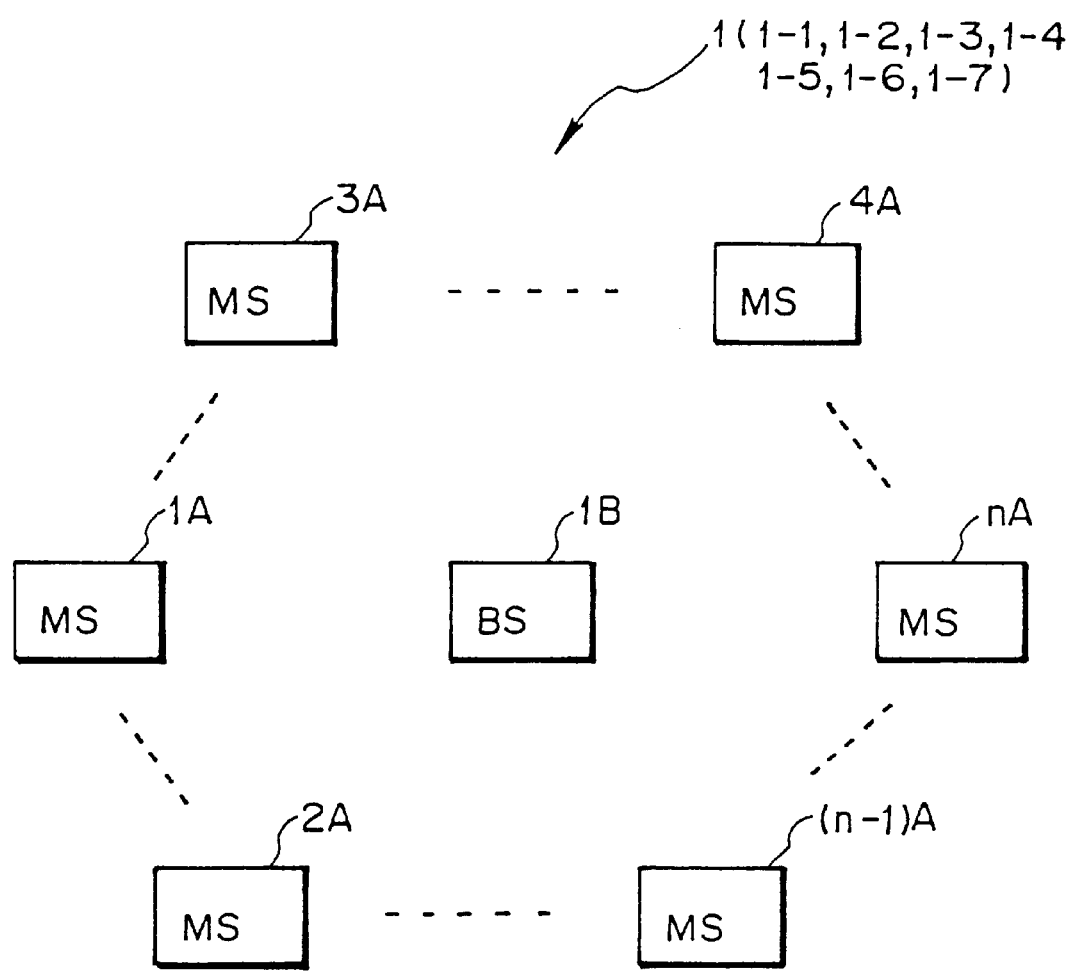
FIG. 2 is a block diagram showing a structure of a CDMA communicating system according to a first embodiment of this invention.

FIG. 2 is a block diagram showing a structure of a CDMA communicating system 1 according to a first embodiment of this invention. As shown in FIG. 2, the CDMA communicating system 1 comprises a BS 1B and a plurality of MSs 1A through nA (n is an integer).

Hereinafter, description will be made on the assumption that the MSs 1A through nA are portable telephones. Description in the case of another mobile equipment is omitted, but this invention is applicable to another mobile equipment in the same or similar manner.

Further, the description will be made on a case where each of the portable telephones (MSs) and the base station (BS) transmit/receive information over a common control channel before the portable telephone initiates a call therebetween.

Each of the MSs 1A through nA is a slave station in a mobile communication. When an MS iA (i; an integer) makes a telephone call to another MS jA [j (j ≠i); an integer), the MS iA puts confirmation information such as its own telephone number or the like in a frame (up), and transmits the frame to the BS 1B.

As shown in. FIG. 3(b), each of the MSs 1A through nA puts information such as user/control information U/C, a terminating node information (TN) designating a terminating place, continuation bits (W) showing that there is a frame to be continuously transmitted, a sequence number (Sequence Number) showing a serial number of a frame to be continuously transmitted, a packet number (Packet ID: PID) as an identifier showing a frame transmitted from its own terminal and the like along with information on its telephone number and the like. Incidentally, each of the MSs 1A through nA can transmit other frame (up) in other format structure.

Figure 3A:
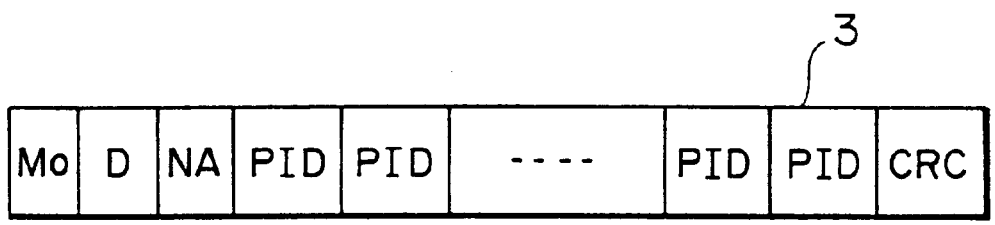
FIGS. 3(a) and 3(b) illustrate examples of structures of frames exchanged between an MS and a BS.
Figure 3B:
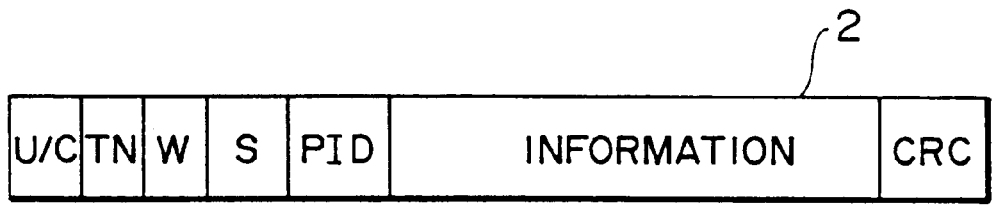

Each of the MSs 1A through nA receives, as shown in FIG. 3(a), a frame (down) 3 stuffed with ACK mode (Mo)

showing that a transmission frame (down) is ACK, the number of put ACKs (NA) and ACK information (Packet ID: PID) from the BS 1B.

With respect to the ACK information (acknowledge information), a PID in the frame (up) 2 transmitted from each of the MS 1A through nA is put as the ACK information in the frame (down) 3, and the frame (down) 3 is stuffed with PIDs of a plurality of MSs and transmitted. The number of stuffed ACKs shows the number of PIDs put in the frame (down) 3. Incidentally, PID as ACK information will be occasionally referred to simply as acknowledge information. Further, PID in the frame (down) in the drawings will be denoted as "MS 1A", "MS 2A" or the like for the sake of convenience, wherein "MS 1A" in the frame (down) 3 in the drawings signifies a PID of the MA 1A, for example.

Hereafter, description will be made in the case where a maximum number of pieces of acknowledge information put in one frame (down) 3 is, for example, "7".

Each of the MSs 1A through nA transmits a frame (up) 2 spread using a spreading code assigned to the plural MSs 1A through nA over a common control channel commonly used by the plural MSs 1A through nA and the BS 1B, and receives a frame (down) 3 transmitted from the BS 1B.

When continuously transmitting remaining information [frames stuffed with remaining information will be referred to as "remaining frames" hereinafter] after transmitting the frames (up) 2 to the BS 1B, the MS 1A through nA have accesses to transmit remaining frames (up) 2 in the order acknowledge information was put in the frame (down) 3 received from the BS 1B.

When each of the MSs 1A through nA first transmits a frame (up) 2 to the BS 1B, each of the MSs 1A through nA randomly selects an access timing at which the frame (up) 2 is transmitted on the basis of notice information transmitted from the BS 1B, and transmits the frame (up) 2.

Incidentally, it is assuemd that there are four access timings in one cycle. Correspondingly to four access timings, a phase of the spreading code in a common system used by the MSs 1A through nA shifts at each timing, so that a signal transmitted at a different timing is spread by the spreading code having a phase different from one another. At the same access timing in each cycle, a signal is spread by the spreading code having the same phase.

A timing at which each of the MSs 1A through nA transmits a remaining frame is set according to an order put in the received frame 3, as stated above. In concrete, when acknowledge information is put in the first position in the frame 3, an access timing is set to the first timing among four access timings. When acknowledge information is put in the second position, an access timing is set to the second access timing. When acknowledge information is put in the fourth position, an access timing is set to the fourth access timing.

If each of the MSs 1A through nA receives no acknowledge information to a frame (up) 2 having been transmitted even when a predetermined time is elapsed, after transmitting the frame (up) 2 to the BS 1B, for example, each of the MSs 1A through nA performs a re-transmitting process.

Figure 4:
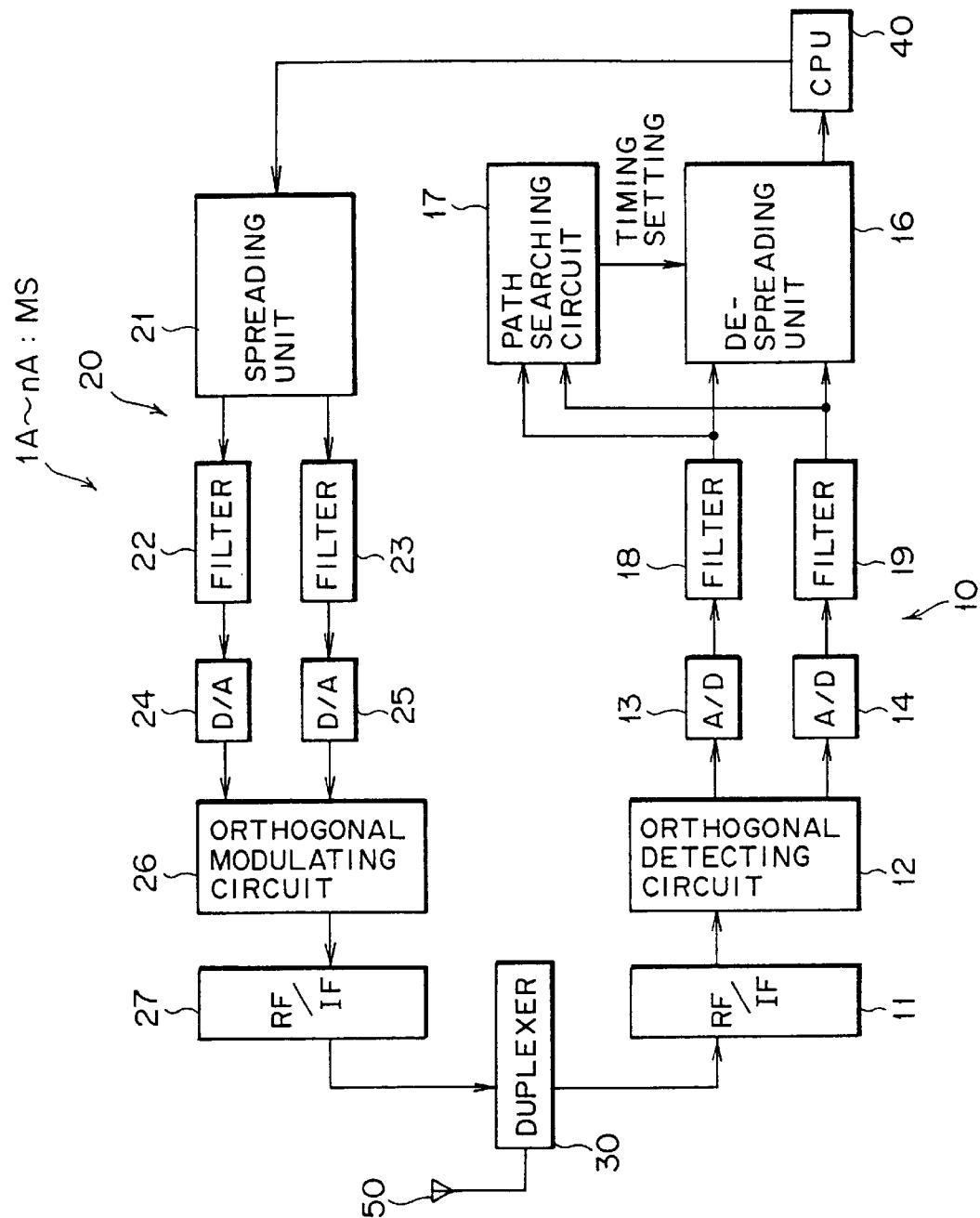
FIG. 4 is a block diagram showing an example of a structure of the MS according to the first embodiment of this invention.

To this end, the MS according to the first embodiment comprises a receiving unit 10, a transmitting unit 20, a duplexer 30, a CPU 40 and an antenna 50, as shown in FIG. 4.

The transmitting unit 20 transmits a frame (up) 2 to the BS 1B. The transmitting unit 20 can transmit a spread spectrum frame obtained by spreading spectrum of a signal from the CPU 40 using the spreading code having a phase corresponding to an access timing, and can transmit other frame (up) as well.

To this end, the transmitting unit 20 comprises, as shown in FIG. 4, a spreading unit 21, filters for waveform shaping 22 and 23, digital/analog converters. (D/A) 24 and 25, an orthogonal modulating circuit 26 and a frequency converting circuit 27.

A spread signal obtained by spreading a signal from the CPU 40 using the spreading code by the spreading unit 21 is separated into a code of I channel and a code of Q channel, inputted to the filters 22 and 23, respectively, in which unnecessary bands are eliminated, then inputted to the digital/analog converting unit (D/A) 24 for I channel components and the digital/analog converting unit (D/A) 25 for Q channel components, respectively, to be converted into corresponding analog signals.

The analog signal of I channel and the analog signal of Q channel converted in the D/As 24 and 25, respectively, are orthogonal-modulated into an orthogonal-modulated signal in the orthogonal modulating circuit 26, up-converted from an intermediate frequency signal (IF signal) to a radio frequency signal (RF signal) in the frequency converting circuit 27, led to the antenna 50 via the duplexer 30, and transmitted.

The receiving unit 10 shown in FIG. 4 receives a frame (down) 3 transmitted from the BS 1B. The receiving unit 10 comprises a frequency converting circuit 11, an orthogonal detecting circuit 12, analog/digital converters 13 and 14, a path searching circuit 17, a de-spreading unit 16, and filters for waveform shaping 18 and 19. Incidentally, the receiving unit 10 can also receive other frame (down) in a format structure different from that of a frame (down) 3 transmitted from the BS 1B.

A signal (redio frequency signal: RF signal) received through the antenna 50 and the duplexer 30 is down-converted into an intermediate frequency signal (IF signal) in the frequency converting circuit 11, and separated into I channel components and Q channel components in the orthogonal detecting circuit 12. The I channel components and the Q channel components are converted into digital signals in the analog/digital converter (A/D) 13 for I channel components and the analog/signal converter (A/D) 14 for Q channel components, respectively.

The digital signals from the A/D converters 13 and 14 are led to the filters 18 and 19, in which unnecessary bands in the digital signals are eliminated, input to the de-spreading unit 16 to be de-spread using a predetermined code. A signal of a de-spread frame (down) 3 is outputted to the CPU 40. The de-spreading unit 16 performs de-spreading on the basis of a set timing from the path searching circuit 17.

The CPU 40 shown in FIG. 4 randomly selects an access timing among four access timings based on information notifying of timings at which the MS accesses to the BS 1B transmitted from the BS 1B when transmitting or the like a frame (up) 2 to the BS 1B over a common control channel, and controls each part so as to transmit the frame (up) 2 to the BS 1B. The CPU 40 also determines whether or not there is acknowledge information to the frame having been transmitted from its own apparatus in a received frame (down) 3. Additionally, when continuously transmitting a remaining frame (up) 2, the CPU 40 determines an order of a piece of acknowledge information to the frame (up) 2 having been transmitted from its own apparatus among plural pieces of acknowledge information put in the frame (down) 3, and makes the spreading unit 21 output a transmit signal so as to transmit the remaining frame (up) 2 at an access timing according to that order.

As stated above, each of the MSs 1A through nA has a function of a randomly accessing means for randomly accessing to the BS 1B, a function of an acknowledge information receiving means for receiving plural pieces of acknowledge information put in a frame (down) 3, in which frame the BS 1B collectively puts acknowledge information for other MSs together with the acknowledge information for the relevant MS, and which frame is transmitted from the BS 1B when the BS 1B receives access signals from the MS 1A through nA having randomly accessed to the BS 1B. Each of the MSs 1A through nA also has a function of a transmitting means for again accessing to the BS 1B to transmit a remaining frame (up) 2 according to an order of a piece of acknowledge information for its own terminal among the plural pieces of acknowledge information received from the BS 1B after randomly accessing to the BS 1B if the terminal has the remaining frame (remaining information) 2 to be continuously transmitted to the BS 1B.

The BS 1B shown in FIG. 2 is a base station in the mobile communication, the BS 1B receiving a frame (up) 2 from each of a plurality of the MSs. 1A through nA over the common control channel and transmitting a frame (down) 3 thereto. When receiving frames (up) 2 transmitted from the MSs 1A through nA, the BS 1B transmits data as shown in FIG. 3(a) as acknowledge information. Incidentally, the BS 1B can exchange information with other BS over an ATM network (not shown in FIG. 2), and set a speech channel between an MS accommodated in another BS and an MS accommodated in itself. The BS 1B can also transmit a frame (down) in a format structure different from that of a frame (down) shown in FIG. 3(a), and receive other frame (up).

Figure 5:
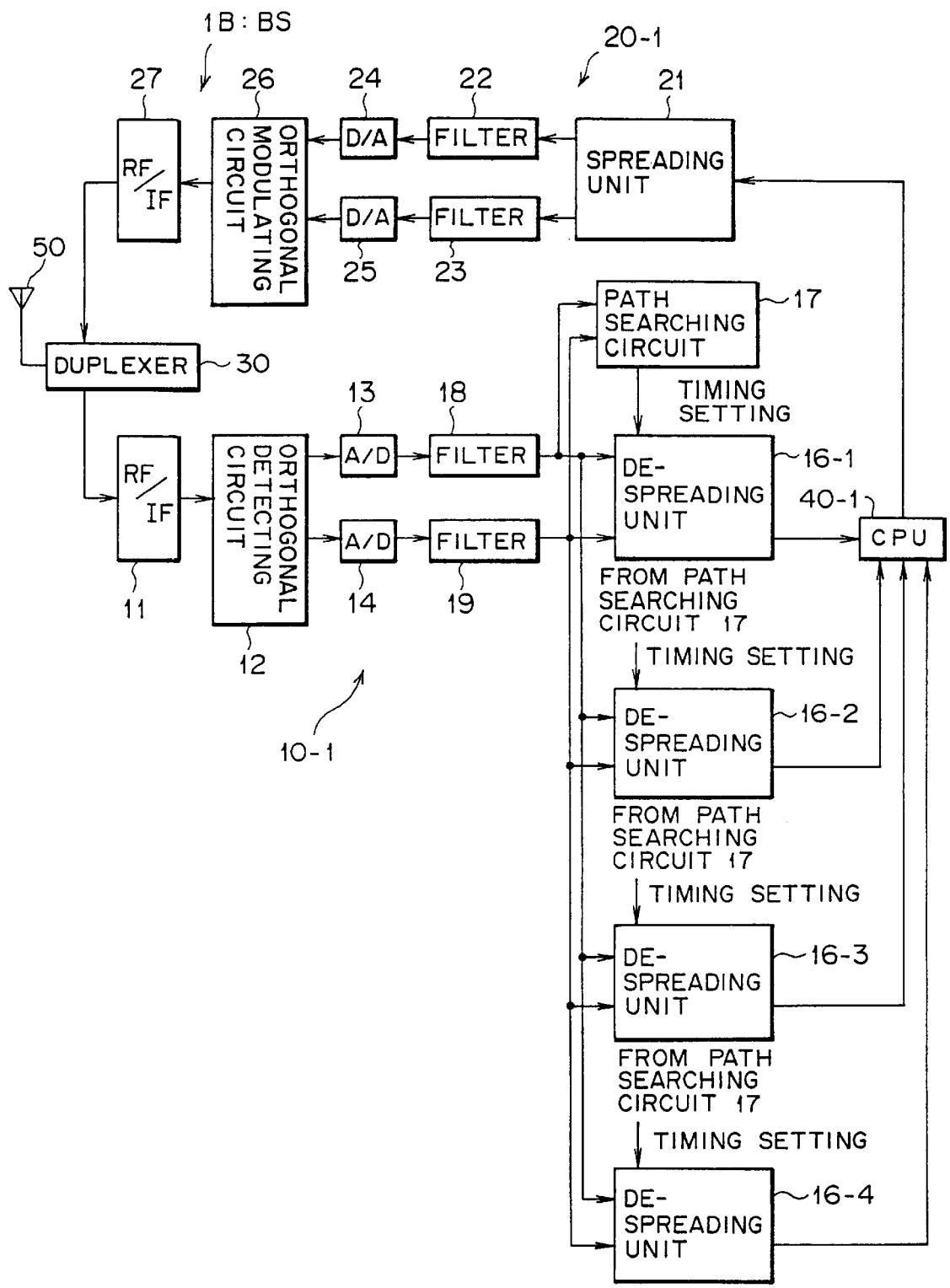
FIG. 5 is a block diagram showing an example of a structure of the BS according to the first embodiment of this invention.

To this end, the BS 1B comprises, as shown in FIG. 5, a receiving unit 10-1, a transmitting unit 20-1, a duplexer 30, a CPU 40-1 and an antenna 50.

The transmitting unit 20-1 comprises a spreading unit 21, filters 22 and 23, D/As 24 and 25, an orthogonal modulating circuit 26 and a frequency converting circuit 27, similarly to the transmitting unit 20 of each of the MSs 1A through nA. The receiving unit 10-1 comprises a frequency converting circuit 11, an orthogonal detecting circuit 12, A/Ds 13 and 14, a path searching circuit 17 and filters for waveform shaping 18 and 19, similarly to the receiving unit 10. However, the receiving unit 10-1 comprises a plurality of de-spreading units 16-1 through 16-4, dissimilarly to the receiving unit 10 shown in FIG. 4.

Correspondingly to that there are four access timings in one cycle at which each of the MSs 1A through nA can transmit a frame (up) 2, the receiving unit 10-1 has the plural de-spreading units 16-1 through 16-4 in order to de-spread a signal transmitted at each timing using a spreading code having a different phase.

When the receiving unit 10-1 receives a signal spread using the spreading code having a different phase transmitted from each of the MSs 1A through nA, any one of the de-spreading units 16-1 through 16-4 de-spreads the received signal using the spreading coce having a desired phase, and notifies of the extracted signal the CPU 40-1.

The CPU 40-1 performs CRC check and the like on the basis of a signal received from any one of the de-spreading units 16-1 through 16-4, and determines contents transmitted from each of the MSs 1A through nA to confirm the reception. The CPU 40-1 then copies a PID put in each of a plurality of received signals [frames (up) 2] in order to send acknowledge information to the reception, and outputs signals put in a frame (down) 3 to the transmitting unit 20-1.

After that, the transmit signals outputted from the CPU 40-1 undergo spectrum spreading and the like using the spreading code having a desired phase in the transmitting unit 20-1, and transmitted from the antenna 50.

As above, the BS 1B has a function as a receiving means for receiving frames (up) 2 from a plurality of the MSs 1A through nA at the time of random accesses from the MSs 1A through nA. The BS 1B also has a function as an acknowledge information transmitting means for putting plural pieces of acknowledge information in a frame (down) 3 and transmitting the frame 3 when receiving frames (up) 2. Namely, when the BS 1B receives access signals from the MSs 1A through nA, the BS 1B puts acknowledge information to reception of the access signals for the plural MSs in a frame (down) 3 in the order the BS 1B received the access signals from the MSs and transmits the frame (down) 3 to the MS2 1A through nA, so that MSs having remaining frames (up) 2 to be continuously transmitted to the BS 1B again access to the MS 1B in a predetermined order to transmit the remaining frames (up) 2.

Figure 6:
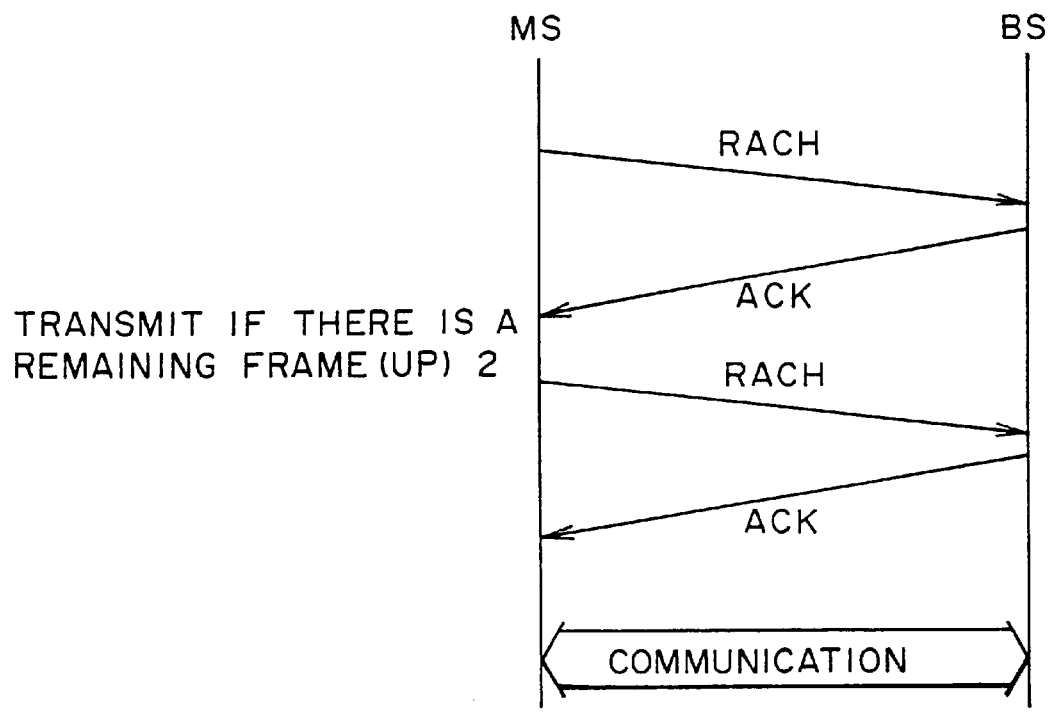
FIG. 6 is a diagram illustrating a signal sequence in the CDMA communicating system according to the first embodiment of this invention.

FIG. 6 is a diagram illustrating a signal sequence in a CDMA communicating system according to this embodiment of this invention. As shown in FIG. 6, an MS kA (k; k=1 through n) selects an access timing, and transmits a frame (up) 2 to the BS 1B. When the BS 1B receives the frame (up) 2 transmitted from the MS kA, the BS 1B puts acknowledge information in a frame (down) 3, and transmits the frame (down) 3 to the MS kA.

The MS kA having transmitted the frame (up) 2 to the BS 1B performs a timer monitoring in order to confirm, for example, reception of ACK. When not receiving ACK in response to the frame (up) 2 having been transmitted within a predetermined period, the MS kA performs a re-transmitting process.

When receiving a frame (down) 3 transmitted from the BS 1B and confirming reception of acknowledge information to the frame (up) 2 having been transmitted put in the frame (down) 3, the MS kA transmits a remaining frame (up) 2 if having the remaining frame (up) 2 to be continuously transmitted.

After the above control signals are exchanged, a communication is initiated.

Next, an operation of the CDMA communicating system 1 according to the first embodiment will be described with reference to time charts shown in FIGS. 7(a) and 7(b), and a flow chart shown in FIG. 8.

In the following description, each of the MSs 1A through 3A is assumed to transmit a remaining frame (up) 2.

In the CDMA communicating system with the above structure according to the first embodiment, each of the MSs 1A through 3A randomly selects an access timing among four access timings within a cycle when transmitting a frame (up) 2 to the BS 1B, and transmits the frame (up) 2.

Figures 7A, 7B:
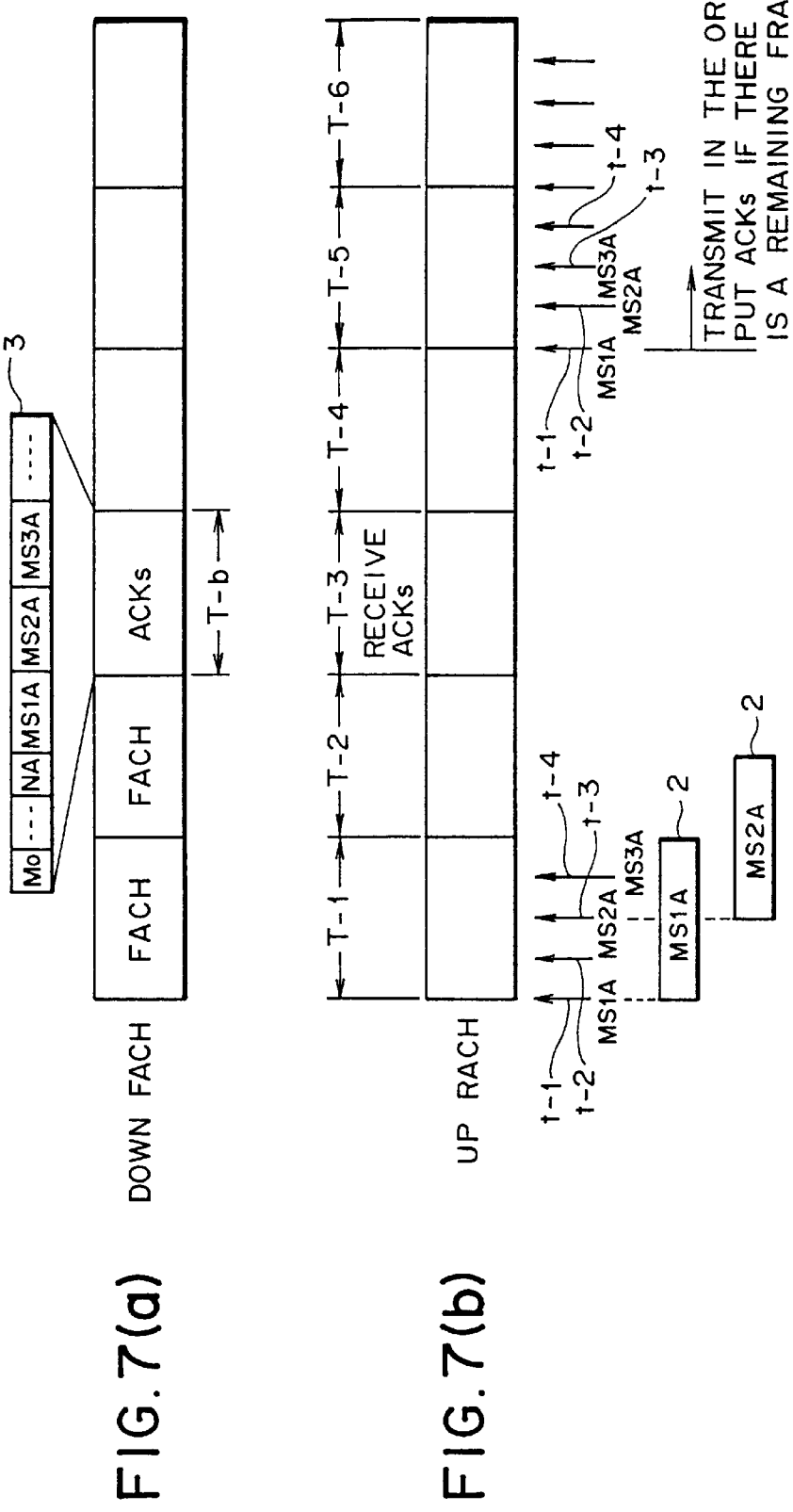
FIGS. 7(a) and 7(b) are time charts illustrating an operation of the CDMA communicating system according to the first embodiment of this invention.

Assuming here that the MS 1A through 3A transmit frames (up) 2 at different access timings (t-1, t-3 and t-4) in cycle T-1, as shown in FIG. 7(b), for example.

Each of the MSs 1A through 3A starts a timer after transmitting a frame (up) 2 (Step S1).

When the BS 1B confirms reception of the frames (up) 2 transmitted from the MSs 1A through 3A, the BS 1B puts acknowledge information to be transmitted to the MSs 1A through 3A in a frame (down) 3 in the order the BS 1B received the frames (up) 2, and transmits the frame (down) 3 [in cycle T-b in FIG. 7(a), for example].

Each of the MSs 1A through 3A receives the frame (down) 3 transmitted from the BS 1B in cycle T-3 in FIG. 7(b), for example (Step S2), and determines in cycle T-4 whether or not the received frame (down) 3 is in ACK mode and has the same PID as a PID that the MS has transmitted (Step S3).

When the frame received from the BS 1B is not in ACK mode or the PID does not coincide with the PID that the MS has transmitted, the MS determines whether or not the started timer is up (from NO route at Step S3 to Step S8). When the timer has counted up to the maximum value, the MS performs a re-transmitting process (from YES route at Step S8 to Step S9). When the timer is not up, the MS moves to a process of receiving a frame (from NO route at Step S8 to Step S2).

Incidentally, when a PID is detected from a received frame (down) 3, a count value of the timer is cleared.

To the contrary, when the PID is the same as the PID that the MS has transmitted, each of the MSs 1A through 3A determines whether or not there is a frame (up) 2 to be continuously transmitted (from YES route at Step S3 to Step S4). When there is no frame (up) 2, the MS completes the transmission (from NO route at Step S4 to Step S10).

When there is a remaining frame (up) 2, each of the MSs 1A through 3A detects a position (order) of its own PID (acknowledge information) among plural pieces of acknowledge information put in the received frame (down) 3 (from YES route at Step S4 to Step S5) sets a transmit timing to a position of the detected PID (Step S6), and transmits the remaining frame (up) 2 (Step S7).

Each of the MSs 1A through 3A confirms an order of acknowledge information to the frame (up) 2 having been transmitted from itself in the frame (down) 3 received in cycle T-3 [refer to FIG. 7(a)]. Here, the MS 1A transmits a remaining frame (up) 2 at access timing t-1 in cycle T-5 since the acknowledge information for the MS 1a is placed in the first position, the MS 2A at access timing t-2, and MS 3A at access timing t-3.

If there is still a remaining frame (up) 2, processes similar to the above (Steps S1 through S7, and Steps S8 through S10) are performed.

In the CDMA communicating system according to the first embodiment of this invention, each of the MSs 1A through 3A again accesses to the BS 1B according to an order of a piece of acknowledge information for its own terminal apparatus among plural pieces of acknowledge information put in a frame (down) 3 received from the BS 1B, and transmits a remaining frame (up) 2 if transmitting the remaining frame (up) 2 after transmitting a frame, for example. Consequently, it is possible to avoid conflict among the MSs 1A through 3A transmitting remaining frames (up) 2 thus suppress a decrease of the throughput.

(b2) Description of a First Modification of the First Embodiment

According to a first modification of the first embodiment, the BS 1B and the MSs 1A through nA have functions almost similar to those described in the first embodiment. However, in a CDMA communicating system (denoted by a different reference character in order to discriminate it from the above CDMA communicating system 1) 1-1, each of the MSs 1A through nA transmits a remaining frame (up) 2 within a set period of transmit timings, dissimilarly to the CDMA communicating system 1 according to the first embodiment. In the description on the first modification, like reference characters designate like or corresponding parts in the first embodiment.

Each of the MSs 1A through nA receives acknowledge information to a transmitted frame (up) 2, and transmits a remaining frame (up) 2 at an access timing within a period set according to an order of acknowledge information to its own frame (up) 2 put in a frame (down) 3.

For example, a period of access timings during which a remaining frame (up) 2 can be transmitted can be set to a different cycle according to an order of acknowledge information put in the frame (down) 3. An access timing at which the remaining frame (up) 2 is transmitted is randomly selected among four access timings in each cycle.

Hereinafter, the description will be proceeded on the above assumption.

Incidentally, the CPU 40 shown in FIG. 4 sets a timing at which the remaining frame (up) 2 is transmitted.

FIGS. 9(a) and 9(b) are time charts for illustrating an operation of the CDMA communicating system 1-1 according to the first modification of the first embodiment of this invention, in which each of the MSs 1A through 3A is assumed to continuously transmit a remaining frame (up) 2 after transmitting a frame (up) 2. As shown in FIG. 9(b), each of the MSs 1A through 3A selects an access timing at which the remaining frame (up) 2 is transmitted in a different cycle T1-5, T1-6 or T1-7 set according to an order of acknowledge information for itself put in a frame (down) 3, and transmits the remaining frame (up) 2.

Figure 10:
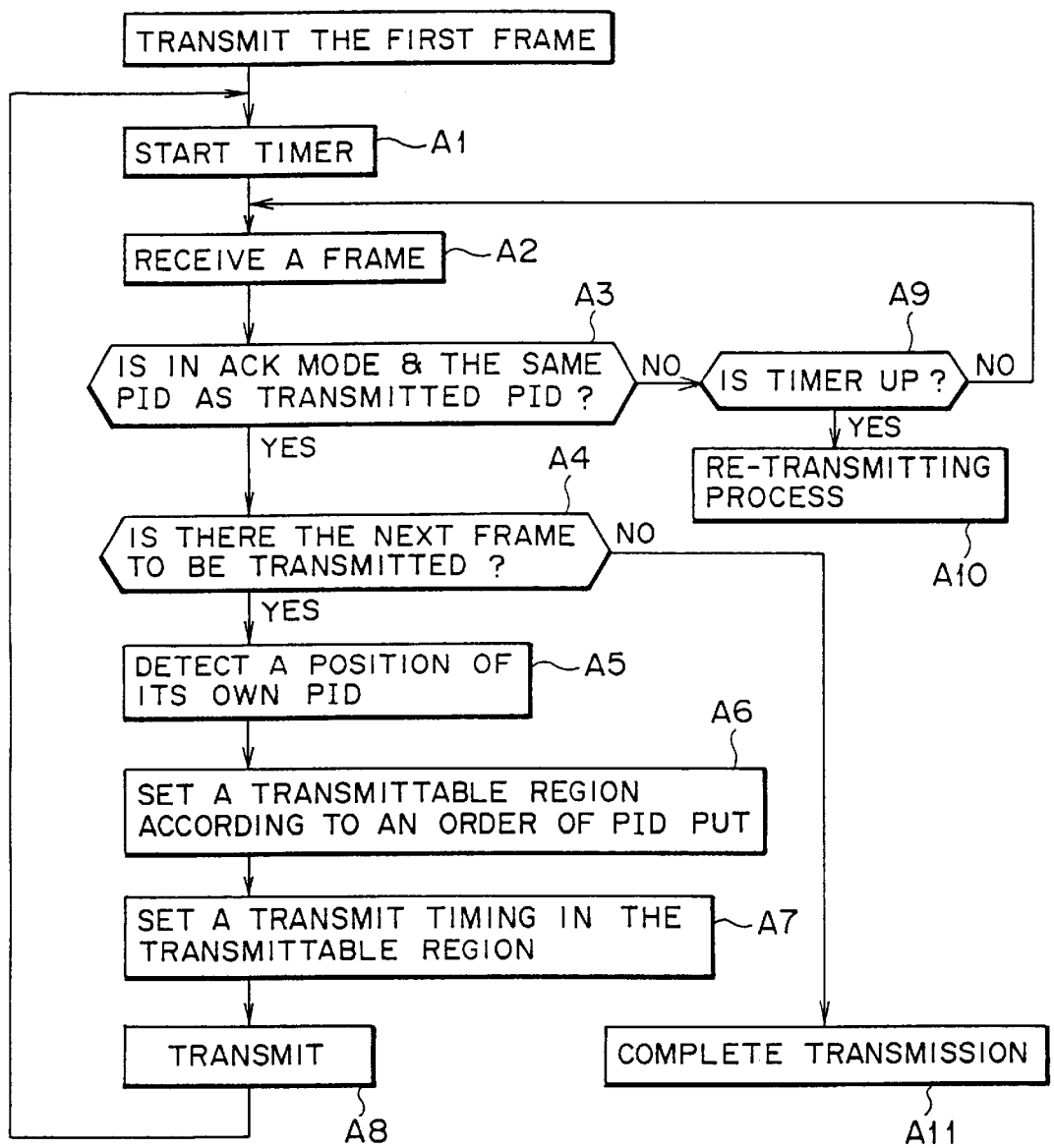
FIG. 10 is a flowchart illustrating an operation of an MS according to the first modification of the first embodiment of this invention.

Hereinafter, an operation of the MS in the CDMA communicating system 1-1 according to the first modification of the first embodiment will be described with reference to time charts shown in FIGS. 9(a) and 9(b) and a flowchart shown in FIG. 10.

In the CDMA communicating system 1-1 with the above structure according to the first modification of the first embodiment, each of the MSs 1A through 3A randomly selects an access timing among four access timings within a cycle when transmitting a frame (up) 2 to the BS 1B.

Hereinafter, the description will be made on the assumption that the MA 1A through 3A transmit frames (up) 2 at access timings (t-1, t-3 and t-4) in cycle T1-1, respectively.

Each of the MSs 1A through 3A starts the timer after transmitting the frame (up) 2 (Step A1).

When the BS 1B confirms reception of frames (up) 2 transmitted from the MSs 1A through 3A, the BS 1B puts acknowledge information for the MSs 1A through 3A in a frame (down) 3 in the order the BS 1B received the frames (up) 2.

Each of the MSs 1A through 3A receives in cycle T1-3 the frame (down) 3 transmitted from the BS 1B (Step A2), and determines in cycle T1-4 whether or not the received frame (down) 3 is in ACK mode and includes the same PID as its own PID having been transmitted (Step A3).

If the frame (down) 3 received from the BS 1B is not in ACK mode or does not include the same PID as its own PID having been transmitted, each of the MSs 1A through 3A determines whether or not the started timer is up (from NO route at Step A3 to Step A9). When the timer has counted up to the maximum value, the MS performs a re-transmitting process (from YES route at Step A9 to Step A10). When the timer does not yet count up to the maximum value, the MS moves to a process of receiving the frame (from NO route at Step A9 to Step A2).

When the PID having been transmitted is detected from the received frame (down) 3, a count value of the timer is cleared.

When-the PID included in the frame (down) 3 coincides with its own PID transmitted, each of the MS 1a through 3A determines whether or not the MS has a remaining frame (up) 2 to be continuously transmitted (from YES route at Step A3 to Step A4). If not having a remaining frame (up) 2, the MS completes the transmission (from NO route at Step A4 to Step A11).

When having a remaining frame (up) 2, the MS detects a position (order) of the PID of its own among plural pieces of acknowledge information put in the received frame (down) 3 (from YES route at Step A4 to according to an order of the detected PID (Step A6), selects an access timing among four access timings in the set cycle, and sets the timing (Step A7).

After that, each of the MS 1A through 3A transmits the remaining frame (up) 2 to the BS 1B at the set access timing (Step A8).

As shown in FIG. 9(b), each of the MS 1A through 3A transmits a remaining frame (up) 2 to the BS 1B according to an order [refer to FIG. 9(a)] of acknowledge information to a frame that itself has transmitted put in a frame (down) 3 received in cycle T1-3. The MS 1A transmits a remaining frame (up) 2 at access timing t-3 randomly selected within cycle T1-5, the MS 2A transmits a remaining frame (up) 2 at access timing t-1 randomly selected within cycle T1-6, and the MS 3A transmits a remaining frame (up) 2 at access timing t-4 randomly selected within cycle T1-7.

If the MS still has a remaining frame (up) 2, processes similar to the above (Step A1 through A8 and Step A9 through A11) are performed.

In the CDMA communicating system of the first modification of the first embodiment has an advantage, in addition to that of the first embodiment. Namely, access timings at which the MSs 1A through 3A transmit remaining frames (up) 2 are not locally concentrated, but are set to, for example, different cycles so as to be distributed, as stated above. As shown in FIG. 9(b), it is thereby possible to avoid conflict with access timings at which the MSs 6A and 7A have also accesses in cycle T1-5, thus further suppressing a decrease of the throughput.

(b3) Description of a Second Modification of the First Embodiment

According to a second modification of the first embodiment, the BS 1B and the MSs 1A through nA have similar functions to those described in the first embodiment. However, in a CDMA communicating system (denoted by a different reference character in order to discriminate it from the above CDMA communicating system 1) 1-2 according to the second modification, a frame (down) 3 in which plural pieces of acknowledge information rearranged in a predetermined order of priority are put is transmitted to a plurality of the MSs 1A through nA, dissimilarly to the CDMA communicating system 1 according to the first embodiment.

Incidentally, like reference characters designate like or corresponding parts in the first embodiment.

To the above end, the BS 1B rearranges plural pieces of acknowledge information to frames (up) 2 transmitted from the MSs 1A through nA in a predetermined order of priority, puts the rearranged acknowledge information in a frame (down) 3, and transmits the frame (down) 3.

The BS 1B determines the order of priority using, for example, continuation bits W [refer to FIG. 3(b)] in a received frame (up) 2.

As an example of the order of priority, a frame having a frame (up) 2 to be continuously transmitted has a higher priority, while a frame without a frame to be continuously transmitted has a lower priority, as shown in Table 1 below.

TABLE 1

Example of the order of priority

| W (bits) | priority | Contents |
| --- | --- | --- |
| 00 | 1 | Being a frame continuously transmitted, and having a frame to be continuously transmitted |
| 10 | 2 | Being a frame initially transmitted, and having a frame to be continuously transmitted |
| 01 | 3 | Being a frame continuously transmitted, and having no frame to be continuously transmitted |
| 11 |   | Being a frame initially transmitted, and having no frame to be continuously transmitted |

The CPU 40-1 rearranges acknowledge information in such the order of priority.

Figure 12:
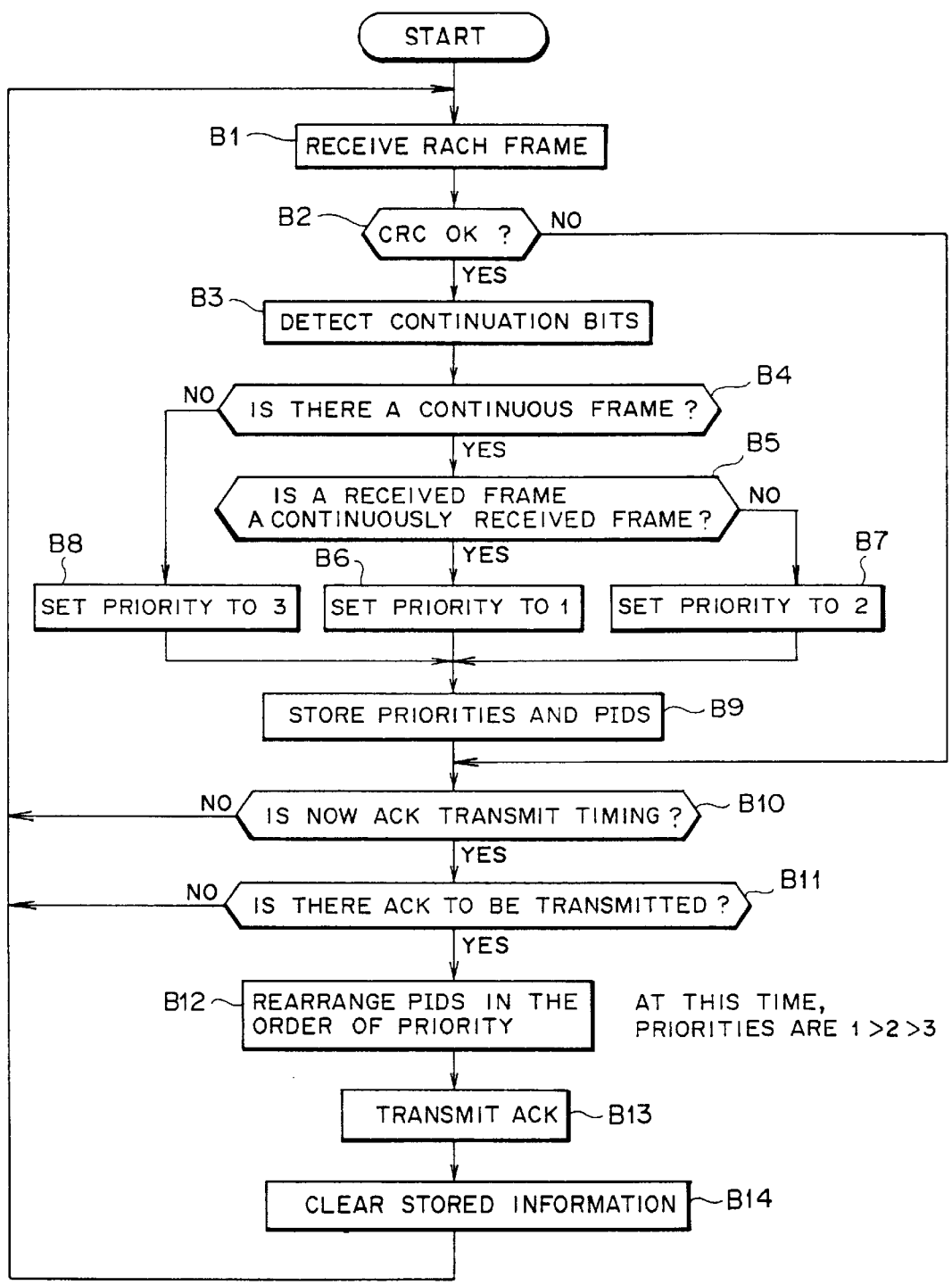
FIG. 12 is a flowchart illustrating an operation of a BS according to the second modification of the first embodiment of this invention.

Next, an operation of the CDMA communicating system 1-2 according to the second modification of the first embodiment will be described with reference to time charts shown in FIGS. 11(a) and 11(b), and FIG. 12.

In the CDMA communicating system 1-2 with the above structure according to the second modification of the first embodiment, each of the MSs 1A through nA selects an access timing among four access timings in a cycle when transmitting a frame (up) 2.

The following description will be made on the assumption that the MS 1A through 3A transmit frames (up) 2 at different access timings (t-1, t-3 and t-4) wherein continuation bits W in the frame (up) 2 transmitted from the MS 1A is "10", continuation bits W in the frame (up) 2 transmitted from the MS 2A is "01", continuation bits W in the frame (up) 2 transmitted from the MS 3A is "00", and the BS 1B receives the frames (up) 2 outputted from the MS 1A through 3A, puts acknowledge information in a frame (down) 3 and transmits the frame (down) 3.

When the BS 1B receives a frame (up) 2 (Step B1), the BS 1B performs CRC check, and determines whether or not a result of the CRC check is normal (Step B2).

When a result of the CRC check is not normal, the BS 1B determines whether or not now is a timing to transmit a frame (down) 3 (from NO route at Step B2 to Step B10).

If a result of the CRC check is normal, the BS 1B detects continuation bits W (from YES route at Step B2 to Step B3).

After that, the BS 1B determines whether or not there is a frame (up) 2 to be continuously received following the received frame (up) 2 on the basis of the detected continuation bits W (Step B4). When there is not a frame (up) 2 to be continuously received, the BS 1B sets the priority to "3" (from NO route at Step B4 to Step B8). For example, when continuation bits W in the received frame (up) 2 are "11" or "01", the BS 1B sets the priority to "3".

When the BS 1B determines that there is a frame (up) 2 to be continuously received, the BS 1B further determines whether or not the received frame (up) 2 is a frame (up) 2 continuously received (from YES route at Step B4 to Step B5). When the received frame (up) 2 is a frame (up) 2 continuously received, the BS 1B sets the priority to "1" (from YES route at Step B5 to Step B6). For example, when continuation bits W in the received frame (up) 2 are "00", the BS 1B sets the priority to "1".

When the received frame (up) 2 is not a frame (up) 2 continuously received, the BS 1B sets the priority to "2" (from NO route at Step B5 to Step B7) For example, continuation bits W in the received frame (up) 2 are "10", the BS 1B sets the priority to "2".

The BS 1B sets the priority of a frame (up) 2 transmitted from the BS 1A to "2", the priority of a frame (up) 2 transmitted from the MS 2A to "3", and a priority of a frame (up) 2 transmitted from the MS 3A to "1".

The BS 1B stores the set priorities and PIDs (from any one of Step B6 through B8 to Step B9), and determines whether or not now is a timing to transmit a frame (down) 3 (from NO route at Step B2 or Step B9 to Step B10)

When the BS 1B determines that now is a timing to transmit a frame (down) 3 (when determined YES at Step B10), the BS 1B determines whether or not there is acknowledge information to be transmitted (from YES route at Step B10 to Step B11). When the BS 1B determines that there is no acknowledge information to be transmitted, the BS 1B repeats the above process (Steps B1 through B11) until determining that there is acknowledge information to be transmitted (until determined YES at Step B11).

When there is acknowledge information to be transmitted, the BS 1B rearranges plural pieces of acknowledge information to be put in the frame (down) 3 in a set order of priority (from YES route at Step B11 to Step B12), and transmits the frame (down) 3 (Step B13).

For example, plural pieces of acknowledge information to the frames (up) 2 transmitted from the MSs 1A through 3A are rearranged in a set order of priority and put in the frame (down) 3 as shown in FIG. 11(a), then transmitted.

After that, the BS 1B clears information or the like on the stored priorities and the PIDs (Step B14), and again performs a process such as a receiving process on a frame (up) 2 (Step B1).

Figure 8:
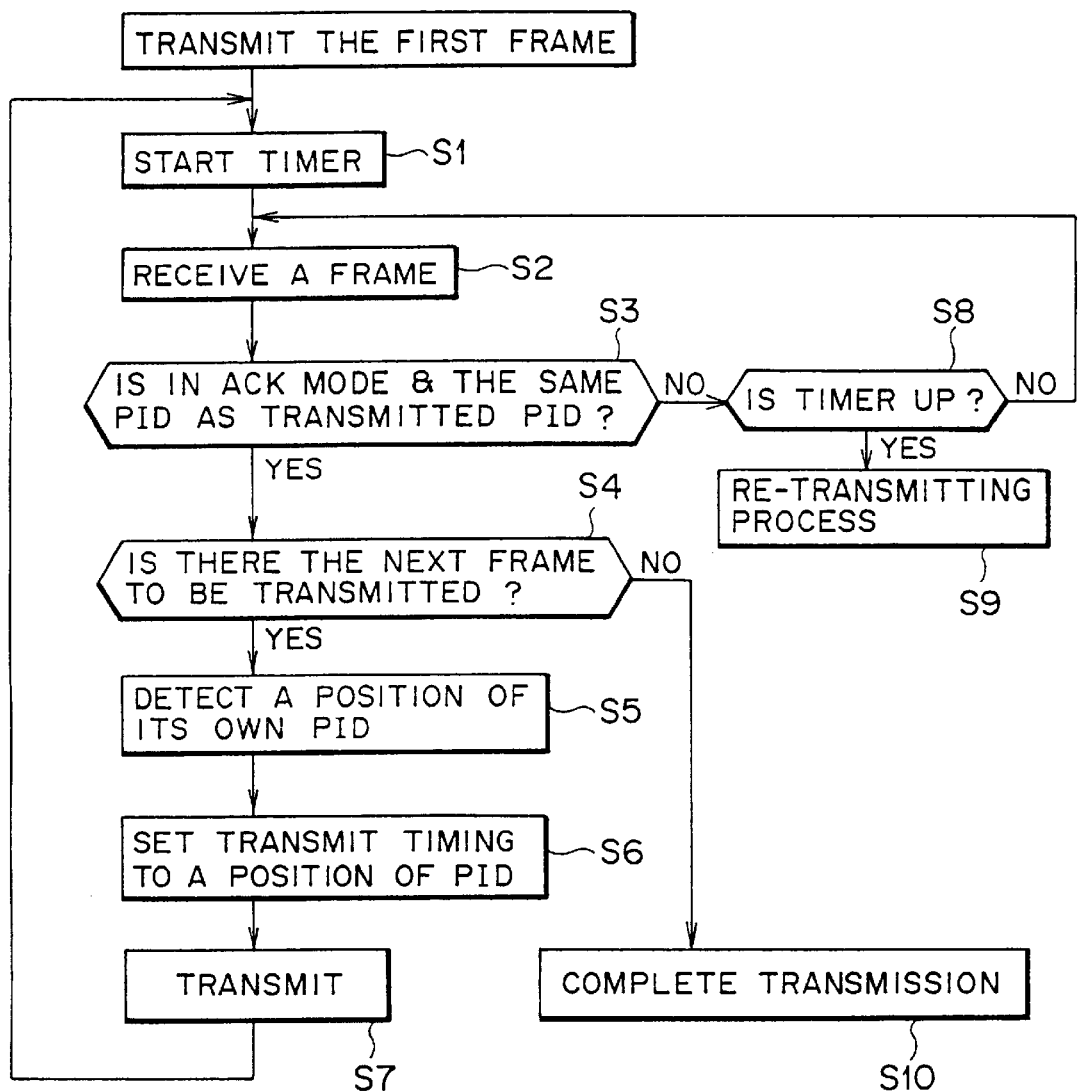
FIG. 8 is a flowchart illustrating an operation of the MS according to the first embodiment of this invention.

The MSs 1A through 3A perform a process shown in FIG. 8 to transmit, in cycle T2-5, remaining frames (up) 2 in the order the acknowledge information was put in the received frame (down) 3.

The CDMA communicating system 1-2 according to the second modification of the first embodiment can attain similar effects to the CDMA communicating system 1 according to the first embodiment. In addition, it is possible to shorten an access time of the MS 3A transmitting information. (transmitting a plurality of frames) having a high priority since the BS 1B transmits a frame (down) 3 in which plural pieces of acknowledge information having been rearranged in the order of priority are put to the MSs 1A through nA.

(b4) Description of a Third Modification of the First Embodiment

According to a third modification of the first embodiment, the BS 1B and the MSs 1A through nA-have similar functions to those described in the first embodiment. However, in a CDMA communicating system (denoted by a different reference character in order to discriminate it from the above CDMA communicating system 1-2) 1-3, each of the MSs 1A through nA transmits a remaining frame (up) 2 in a set period of transmit timings, dissimilarly to the CDMA communicating system 1-2 according to the above second modification of the first embodiment.

In the description on the third modification of the first embodiment, like reference characters designate like or corresponding parts in the second modification of the first embodiment.

To the above end, each of the MSs 1A through nA receives acknowledge information to a transmitted frame (up) 2, and transmits a remaining frame (up) 2 at a timing within a set period of access timings set according to an order of a piece of acknowledge information for itself put in a frame (down) 3. Incidentally, plural pieces of acknowledge information put in the frame (down) 3 are rearranged in the order of priority shown in Table 1 by the BS 1B.

For example, it is possible to set a period of access timings during which a remaining frame (up) 2 is transmitted to a different cycle according to an order of acknowledge information put in a frame (down) 3. An access timing at which the remaining frame (up) 2 is transmitted is randomly selected among four access timings in each cycle.

Incidentally, the CPU 40 (refer to FIG. 4) sets or the like an access timing at which the remaining frame (up) 2 is transmitted.

Hereinafter, the following description will be made on the above assumption.

Figure 13A:
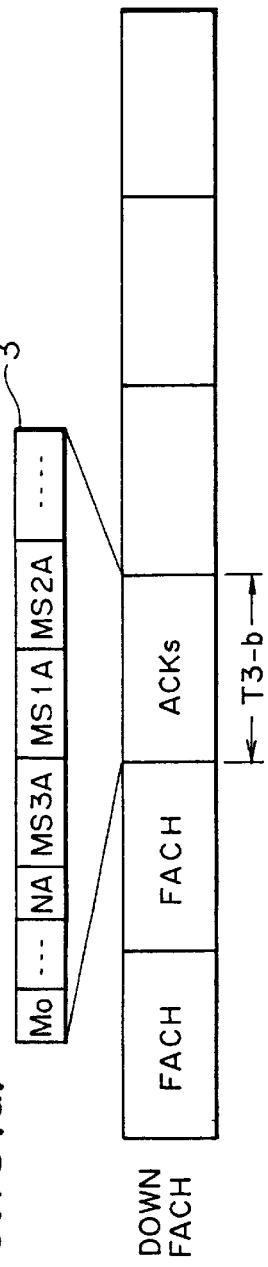
FIGS. 13(a) and 13(b) are time charts illustrating an operation of a CDMA communicating system according to a third modification of the first embodiment of this invention.
Figure 13B:
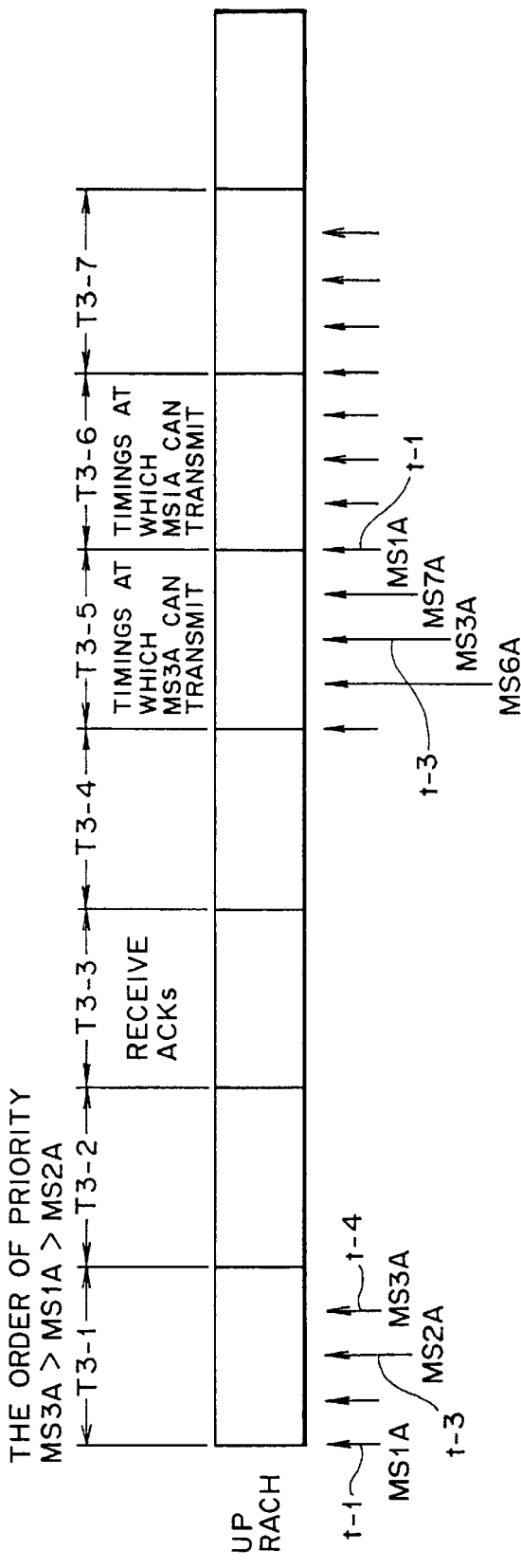

FIGS. 13(a) and 13(b) are time charts for illustrating an operation of the CDMA communicating system 1-2 according to the third modification of the first embodiment of this invention. Assuming that the MSs 1A and 3A continuously transmit remaining frames (up) 2 after the MSs 1A through. 3A transmit frames (up) 2.

As shown in FIGS. 13(a) and 13(b), each of the MSs 1A and 3A selects an access timing to transmit a remaining frame (up) 2 within a different cycle T3-5 or T3-6 according to an order of acknowledge information put in a frame (down) 3, and transmits the remaining frame (up) 2.

In the CDMA communicating system 1-3 with the above structure according to the third modification of the first embodiment, each of the MSs 1A through 3A randomly selects an access timing among four access timings within a cycle when transmitting a frame (up) 2 to the BS 1B, and transmits the frame (up) 2.

Hereinafter, description will be made, with reference to a flowchart in FIG. 10, on the assumption that the MSs 1A through 3A transmit frames (up) 2 at different access timings (t-1, t-3 and t4) in cycle T3-1 as shown in FIG. 13(b).

Each of the MSs 1A through 3A starts the timer after transmitting a frame (up) 2 (Step A1).

When the BS 1B confirms reception of the frames (up) 2 transmitted from the MSs 1A through 3A, the BS 1B transmits a frame (down) 3 in which acknowledge information for the MSs 1A through 3A rearranged in the order of priority shown in Table 1 is put. Here, continuation bits W of a frame (up) 2 transmitted from the MS 1A are assumed to be "10", continuation bits W of a frame (up) 2 transmitted from the MS 2A are assumed to be "01", and continuation bits W of a frame (up) 2 transmitted from the MS 3A are assumed to be "00".

The BS 1B rearranges, on the basis of the continuation bits W, acknowledge information to the frames (up) to be put in the order of priority. The BS 1B puts acknowledge information to the frames (up) 2 transmitted from the MSs 1A and 2A in a frame (down) 3 in the order the BS 1B received the frames (up) 2.

When putting acknowledge information to the frame (up) 2 transmitted from the MS 3A in the frame (down) 3, the BS 1B rearranges the acknowledge information so as to put the acknowledge information to the frame (up) 2 transmitted from the MS 3A ahead of the acknowledge information for the MSs 1A and 2A since the priority of the frame (up) 2 from the MS 3A has a higher priority "1" than the priorities "2" and "3" of the acknowledge information having already put in the frame (down) 3. When a timing to transmit the frame (down) 3 comes [for example, cycle T3-b shown in FIG. 13(a)], the BS 1B transmits the frame (down) 3.

Each of the MSs 1A through 3A receives, in cycle T3-3, the frame (down) 3 transmitted from the BS 1B (Step A2)

and determines, in cycle T3-4, whether or not the received frame (down) 3 is in ACK mode and has the same PID as a PID having been transmitted (Step A3).

When the frame received from the BS 1B is not in ACK mode or has a PID different from a PID having been transmitted, the MS determines whether or not the started timer is up (from NO route at Step A3 to Step A9). When the timer has counted up to the maximum value, the MS performs a re-transmitting process (from YES route at Step A9 to Step A10). When the timer has not yet counted up, the MS moves to a process of receiving a frame (from NO route at Step A9 to Step A2).

Incidentally, a count value of the timer is cleared when a PID having been transmitted is detected from the received frame (down) 3.

When the PID is the same as a PID having been transmitted, each of the MSs 1A through 3A determines whether or not there is a remaining frame (up) 2 to be continuously transmitted (from YES route at Step A3 to Step A4). If there is no remaining frame (up) 2, the MS completes the transmission (from NO route at Step A4 to Step A11).

When there is a remaining frame (up) 2, each of the MSs 1A through 3A detects a position (order) of its own PID among plural pieces of acknowledge information put in the received frame (down) 3 (from YES route at Step A4 to Step A5), sets a transmittable cycle according to an order of the detected PID (Step A6), and selects an access timing among four access timings in the set cycle to set the same (Step A7).

When the set access timing comes thereafter, each of the MSs 1A through 3A transmits a remaining frame (up) 2 to the BS 1B (Step A8).

As shown in FIG. 13(b), the MSs 1A and 3A transmit remaining frames in the order [refer to FIG. 9(a)] plural pieces of acknowledge information to frames (up) 2 transmitted from themselves were put in the frame (down) 3 received in cycle T3-3. The MS 1A transmits, in cycle T3-6, a remaining frame (up) 2 at an access timing randomly selected, while the MS 3A transmits, in cycle T3-5, a remaining frame (up) 2 at an access timing randomly selected.

If there is still a remaining frame (up) 2, processes similar-to the above. (Step A1 through A8 and Steps A9 through A11) are performed.

The CDMA communicating system 1-3 according to the third modification of the first embodiment achieves almost the same effects as the CDMA communicating system 1-2 according to the second modification of the first embodiment. In addition, access timings at which the MSs 1A through 3A transmit remaining frames (up) 2 are not locally concentrated, but distributed since the access timings are set in different cycles, for example. It is possible to avoid conflict with timings at which other MSs 6A and 7A access in cycle T3-5, as shown in FIG. 13(b), which more suppresses a decrease of the throughput.

(b5) Description of a Fourth Modification of the First Embodiment

According to a fourth modification of the first embodiment, the BS 1B and the MSs 1A through nA have similar functions to those described in the first embodiment. However, in a CDMA communicating system (denoted by a different reference character in order to discriminate it from the above CDMA communicating system 1) 1-4 according to the fourth modification, when each of the MS 1A through nA intending to transmit a frame (up) 2 receives a frame (down) 3 before initiate a random access, the MS delays a transmit timing by the number of pieces of acknowledge information put in the received frame (down) 3 and has a random access to the BS 1B, dissimilarly to the CDMA communicating system 1 according to the first embodiment.

Incidentally, like reference characters designate like or corresponding parts in the first embodiments.

Each of the MSs 1A through nA receives signals transmitted from the BS 1B when transmitting a frame (up) 2 to determine whether or not the signals are a frame (down) 3. When the signals are a frame (down) 3, the each of the MS delays a transmit timing by the number of pieces of acknowledge information put in the frame (down) 3, and transmits a frame (up) 2 to the BS 1B.

The CPU 40 (refer to FIG. 4) sets a timing of a random access and the like on the basis of the received frame (down) 3 and the like when the MS transmits the first frame (up) 2.

Next, an operation of the CDMA system 1-6 with the above structure according to the fourth modification of the first embodiment will be described with reference to time charts in FIGS. 14(a) and 14(b) and FIG. 15.

The following description will be made on the assumption that the MSs 1A through 3A transmit frames (up) 2 at different access timings (t-1, t-3 and t-4) in cycle T4-1 shown in FIG. 14(b), the BS 1B transmits in cycle T4-b a frame (down) 3 in which acknowledge information for the MSs 1A through 3A is put, and the MS 6A randomly accesses in another cycle T4-2.

When there occurs a random access process in the MS 6A in cycle T4-2 (Step C1), the MS 6A receives a frame transmitted from the BS 1B, to begin with (Step C2).

The MS 6A performs CRC check on the received frame to determine whether or not the CRC check is normal, besides determining whether or not the received frame is in ACK mode (Step C3).

When the CRC check on the received frame is not normal or the received frame (down) is not in ACK mode, the MS 6A initiates a random access (from NO route at Step C3 to Step C6). When the CRC check is normal and the received frame is in ACK mode [when the received frame is a frame (down) 3], the MS 6A detects the number of put ACKs from the received frame (down) 3 (from YES route at Step C3 to Step C4), and sets a transmit timing so as to delay the transmit timing by the number of the put ACKs (Step C5). When the set transmit timing comes, the MS 6A starts a random access (Step C6).

Figures 14A, 14B:
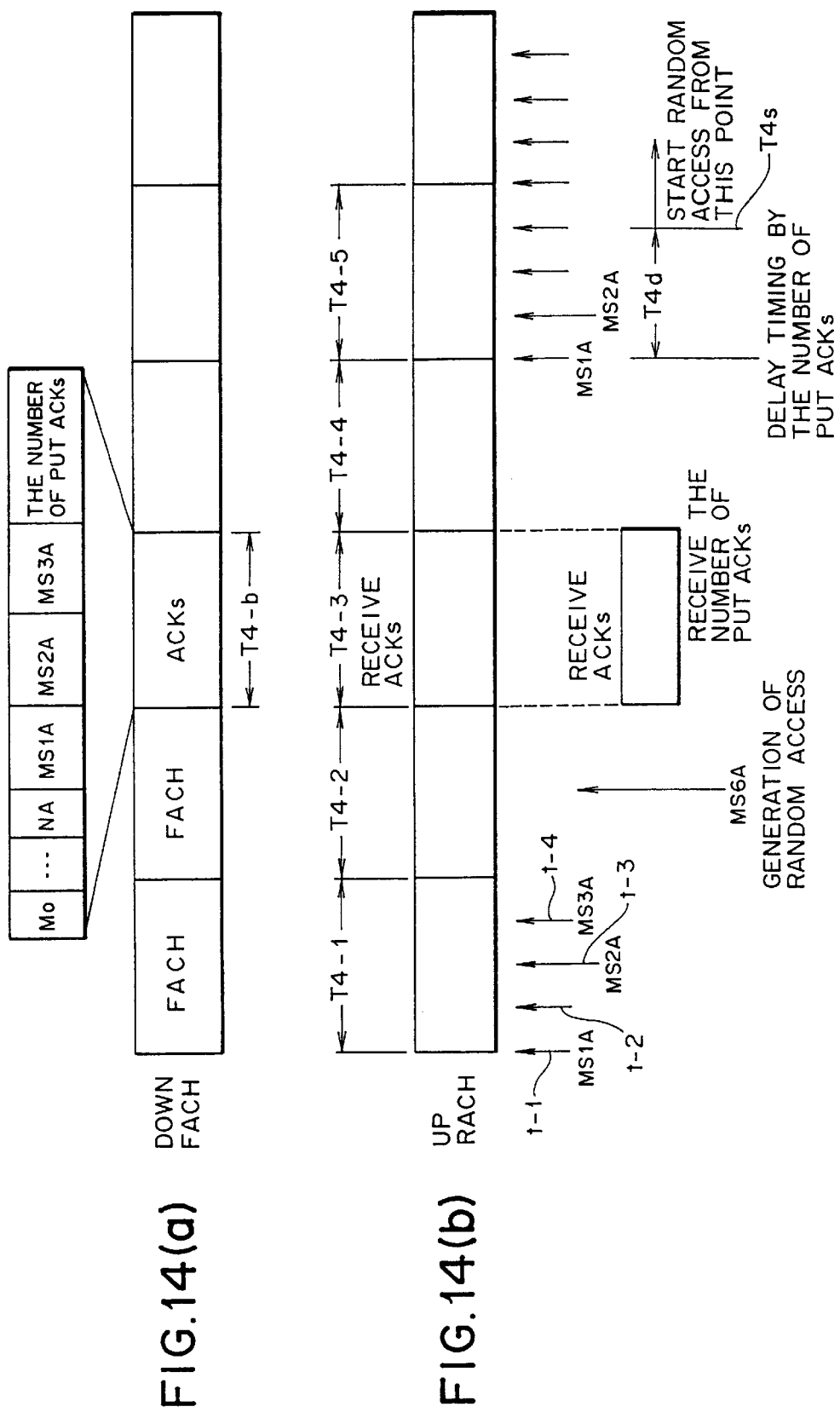
FIGS. 14(a) and 14(b) are time charts illustrating a CDMA communicating system according to a fourth modification of the first embodiment of this invention.
Figure 15:
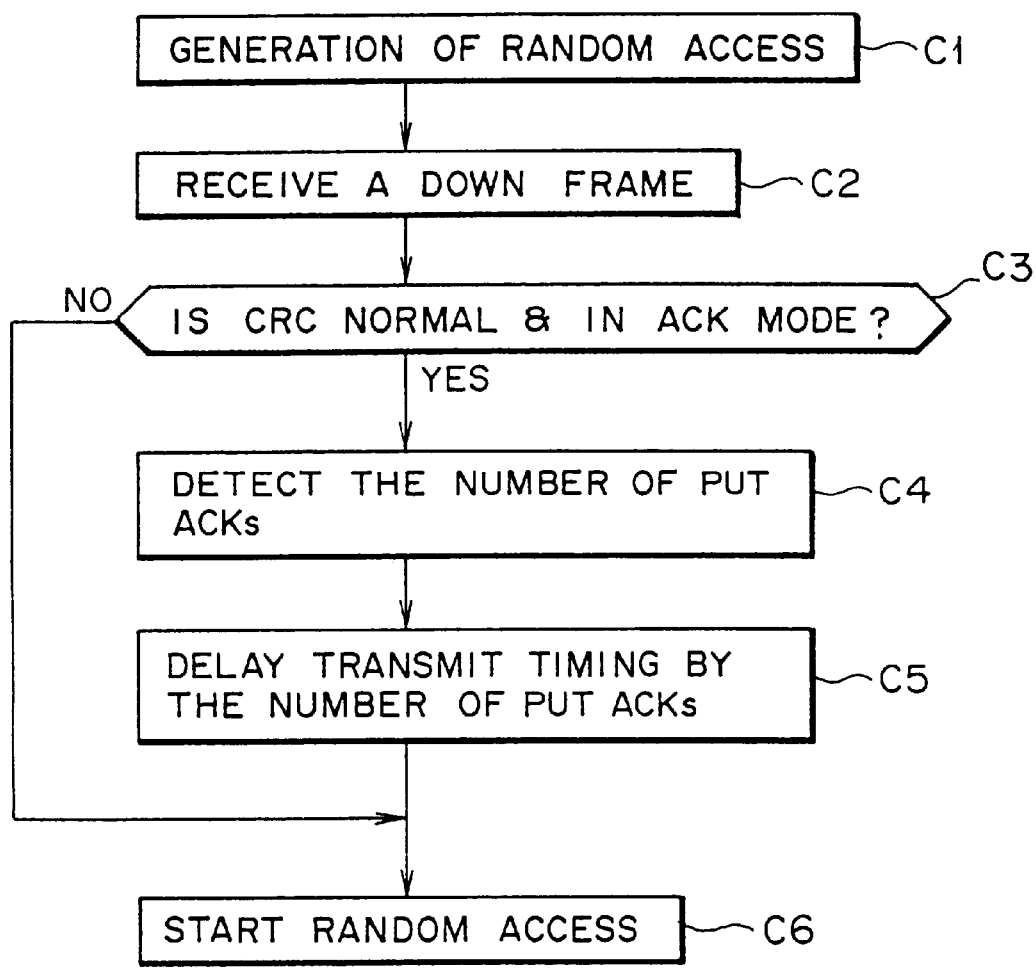
FIG. 15 is a flowchart illustrating an operation of an MS according to the fourth modification of the first embodiment of this invention.

The MS 6A receives a frame (down) 3 in cycle T4-3 shown in FIG. 14(b) (Step C2), performs processes for confirmation on received contents and the like in cycle T4-4 (Steps C3 and C4), delays a random access by the number of put ACKs (three) in cycle T4-5 [denoted by T4d in FIG. 14(b)] since the number of put ACKs in the frame (down) 3 is "3", and starts the random access at/after a timing denoted by T4s. Namely, the MS 6A randomly selects a timing at/after timing T4s, and transmits a frame (up) 2 to the BS 1B.

As above, the CDMA communicating system 1-4 according to the fourth modification of the first embodiment has the same effects as the above first embodiment. In addition, the MS 6A receives a frame from the Bs 1B before first randomly accessing to the base station, delays a transmit timing by the number of pieces of acknowledge information put in the received frame (down) 3, and randomly accesses to the BS 1B, so that conflict between the MS 6A first accessing to the BS 1B and the MSs 1A and 2A transmitting remaining frames (up) 2 is avoided, thus a decrease of a throughput of the system is more suppressed.

(b6) Description of a Fifth Modification of the First Embodiment.

According to a fifth modification of the first embodiment, the BS 1B and the MSs 1A through nA have similar functions to those described in the first embodiment. However, in a CDMA communicating system (denoted by a different reference character in order to discriminate it from the above CDMA communicating system 1) 1-5 according to the fifth modification, the BS 1B puts the second ACK information showing the number of MSs intending to continuously transmit frames (up) 2 in a frame (down) 3 along with acknowledge information rearranged in a predetermined order of priority, and transmits the frame (down) 3 to the MSs 1A through nA, while each of the MSs 1A through nA transmitting a frame (up) 2 delays a transmit timing by the number of put ACKs shown by the second ACK information put in a received frame (down) 3 when receiving the frame (down) 3 before starting a random access, and has a random access to the BS 1B, dissimilarly to the CDMA communicating system 1 according to the first embodiment.

Incidentally, like reference characters designate like or corresponding parts in the first embodiment.

The BS 1B rearranges an order of acknowledge information to be put in a frame (down) 3 on the basis of continuation bits W [refer to FIG. 3(b)] put in the frames (up) 2 transmitted from the MSs 1A through nA, puts the second ACK information showing the number of MSs intending to continuously transmit frames (up) 2 in the frame (down) 3 along with acknowledge information, and transmits the frame (down) 3.

In the ACK format shown in FIG. 3(a), it is possible to replace "NA" with the second ACK information "N" to configure the frame (down) 3.

The following description will be made on the assumption that the BS 1B transmits a frame (down) 3 in which "NA" is replaced with the second ACK information "N", for example.

Incidentally, the CPU (refer to FIG. 5) 40-1 puts desired information such as the second ACK information and the like to be put in a frame (down) 3 on the basis of continuation bits W [refer to FIG. 3(b)] in a received frame (up) 2.

When continuation bits put in a frame (up) 2 transmitted from each of the MSs 1A through nA are in the bit structure shown in Table 1 above, for example, the BS 1B sets the priority of the frames (up) 2 whose continuation bits W are "00" or "10" to "1" and counts up the number N of frames to be continuously transmitted, while setting the priority of the frames (up) 2 whose continuation bits W are "01" or "11" to "3", and rearranging acknowledge information to be put in a frame (down) 3 in the order of priority.

The MSs 1A through nA receives signals transmitted from the BS 1B when transmitting a frame (up) 2 to determine whether or not the received frame is a frame (down) 3. When the received frame is a frame (down) 3, each of the MSs 1A through nA delays a transmit timing by the number of pieces of acknowledge information put in the frame (down) 3, and transmits the frame (up) 2 to the BS 1B.

Incidentally, the CPU 40 (refer to FIG. 4) sets a timing or the like to transmit a frame (up) 2 to be first transmitted on the basis of the received frame (down) 3.

Next, an operation of the CDMA communicating system 1-5 with the above structure according to the fifth modification of the first embodiment will be described with reference to time charts in FIGS. 16(a) and 16(b) and FIGS. 17 and 18.

The following description will be made on the assumption that the MSs 1A through 3A transmit frames (up) 2 at different access timings (t-1, t-3 and t-4) in cycle T5-1 shown in FIG. 16(b), the BS 1B transmits in cycle T5-b a frame (down) 3 in which acknowledge information for the MSs 1A through 3A is put, and there occurs a random access by the MS 6A in another cycle T5-2.

Figure 18:
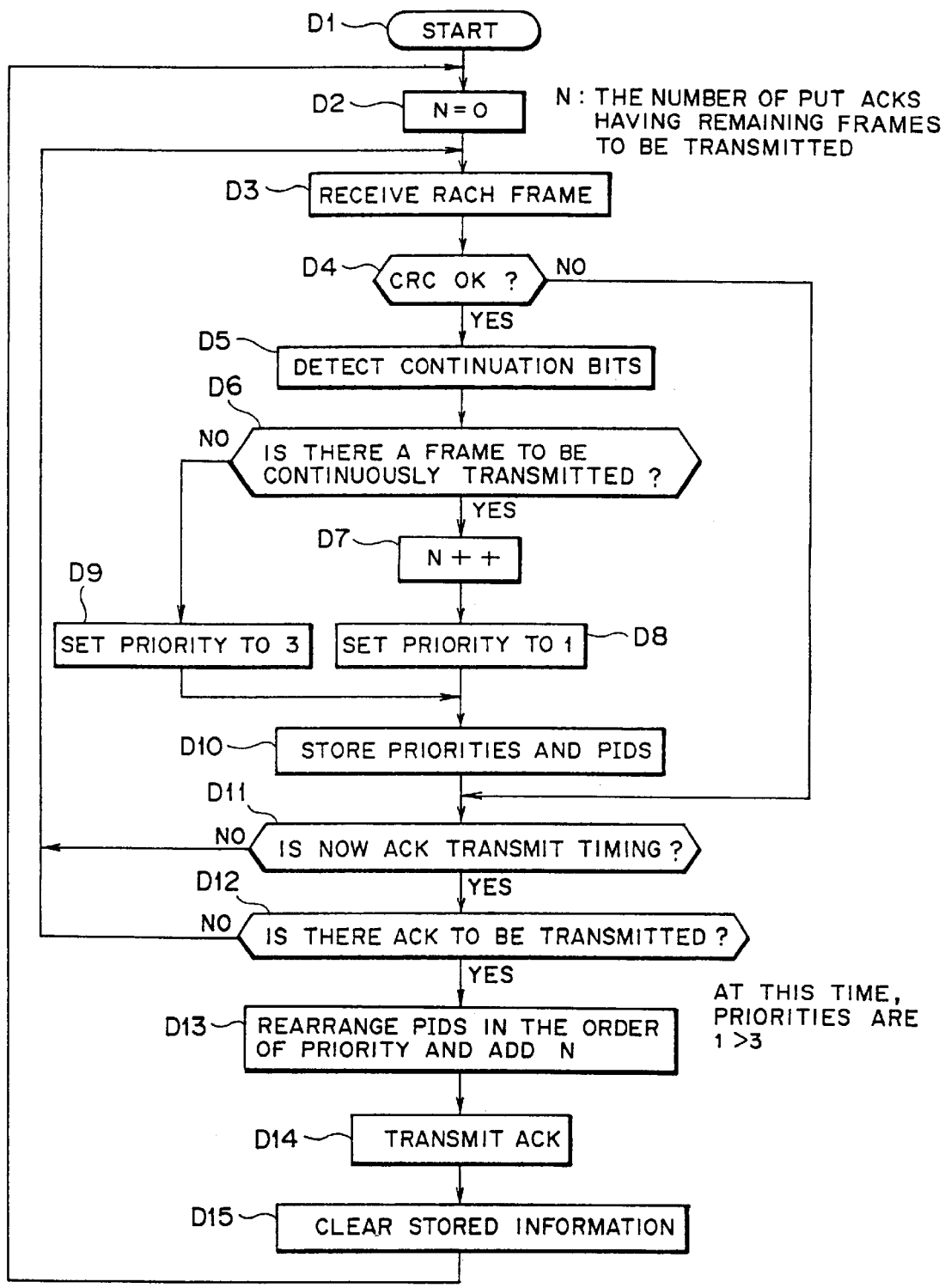
FIG. 18 is a flowchart illustrating an operation of a BS according to the fifth modification of the first embodiment of this invention.

As shown in FIG. 18, when the BS 1B starts a process of transmitting a frame (down) 3 (Step D1), the BS 1B clears the number "N" of MSs intending to transmit remaining frames (up) 2 (the second ACK information) so as to make it "0" (Step D2).

When receiving a frame transmitted from each of the MSs 1A through nA (Step D3), the BS 1B performs CRC check to determine whether or not a result of the CRC check is normal (Step D4). When a result of the CRC check is not normal, the BS 1B further determines whether or not now is a timing to transmit a frame (down) 3 (from NO route at Step D4 to Step D11).

When a result of the CRC check is normal, the BS 1B detects continuation bits W from the received frame(up) 2 (from YES route at Step D4 to Step D5), and further determines whether or not there is a frame (up) 2 to be continuously received (Step D6).

When the BS 1B determines that there is not a frame (up) 2 to be continuously received, the BS 1B sets the priority to "3" (from NO route at Step D6 to Step D9). When the BS 1B determines that there is a frame (up) 2 to be continuously received, the BS 1B counts up the number (N) of MSs intending to transmit remaining frames (up) 2 (from YES route at Step D6 to Step D7), sets the priority to "1" (Step D8), and stores the priorities and PIDs thereof (Step D8 or Step D9 to Step D10).

When continuation bits W in a frame (up) 2 transmitted from the MS 1A in cycle T5-1 are "00", continuation bits W in a frame (up) 2 transmitted from the MS 2A are "10" and continuation bits W in a frame (up) 2 transmitted from the MS 3A are "11", for example, the BS 1B counts the second ACK information as "2", and stores "2" and the priority of each frame (up) 2.

The BS 1B next determines whether or not now is a timing to transmit the frame (down) 3 (from NO route at Step D4 or Step D10 to Step D11). When now is not a transmit timing, the BS 1B repeats the above process (from NO route at Step D11 to Step D3) until a transmit timing comes (until determined YES at Step D11).

The BS 1B determines whether or not there is acknowledge information to be transmitted when determining that a transmit timing comes (from YES route at Step D11 to Step D12). When there is not acknowledge information to be transmitted, the BS 1B repeats the above process (from NO route at Step D12 to Step D3) until determining that there is acknowledge information to be transmitted (until determined YES at Step D12). When there is acknowledge information to be transmitted, the BS 1B rearranges PIDs in the order of priority, puts the acknowledge information along with the second ACK information (N) in the frame (down) 3 (from YES route at Step D12 to Step D13), and transmits the frame (down) 3 (Step D14) After transmitting the frame (down) 3, the BS 1B clears stored information on the priorities and the like (Step D15).

Figure 16:
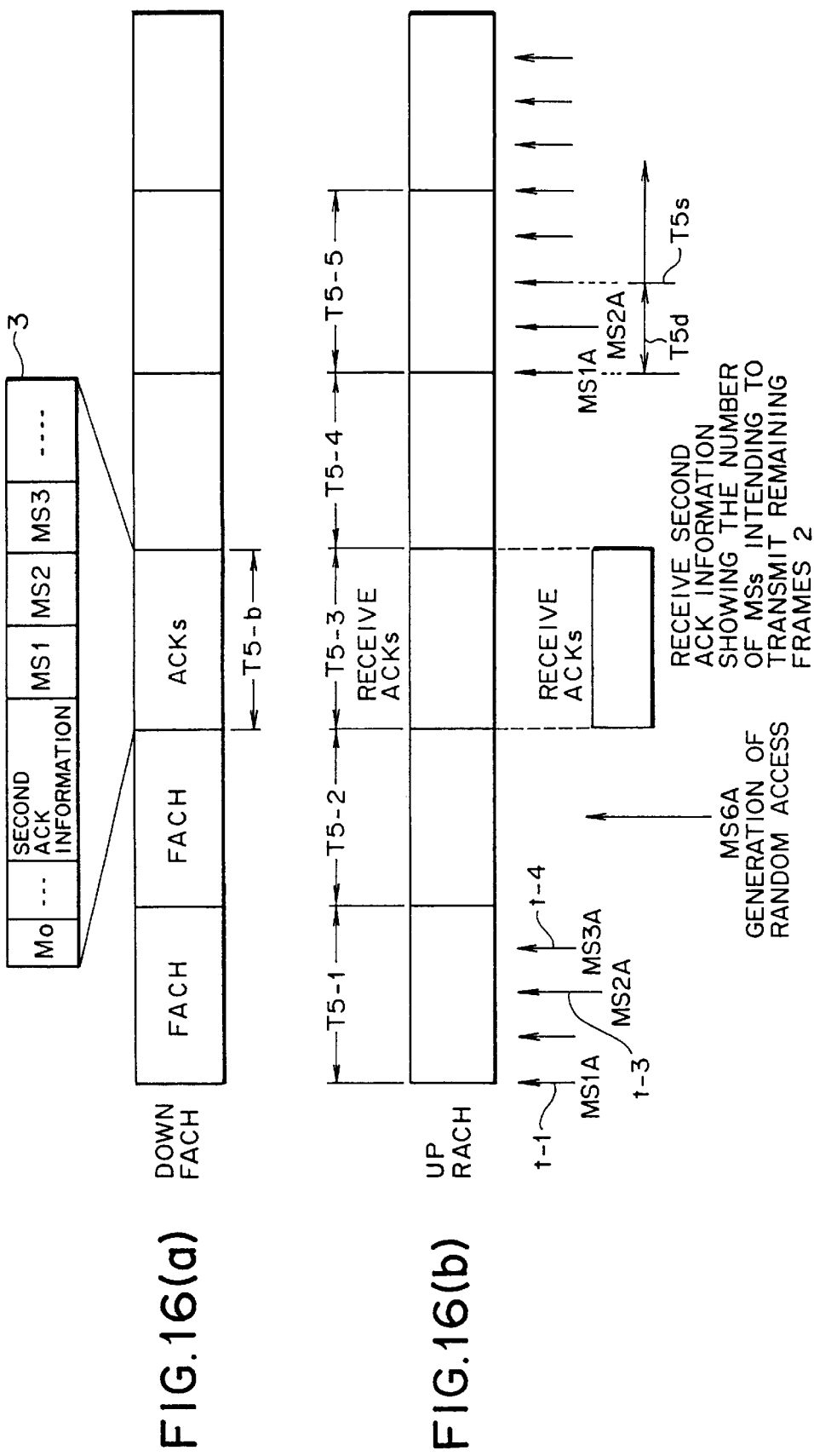
FIGS. 16(a) and 16(b) are time charts illustrating an operation of a CDMA communicating system according to a fifth modification of the first embodiment of this invention.

For example, acknowledge information to the frames (up) 2 transmitted from the MSs 1A through 3A is rearranged in the order of priority as shown in FIG. 16(a), and transmitted along with the second ACK information "N" in cycle T5-b.

Figure 17:
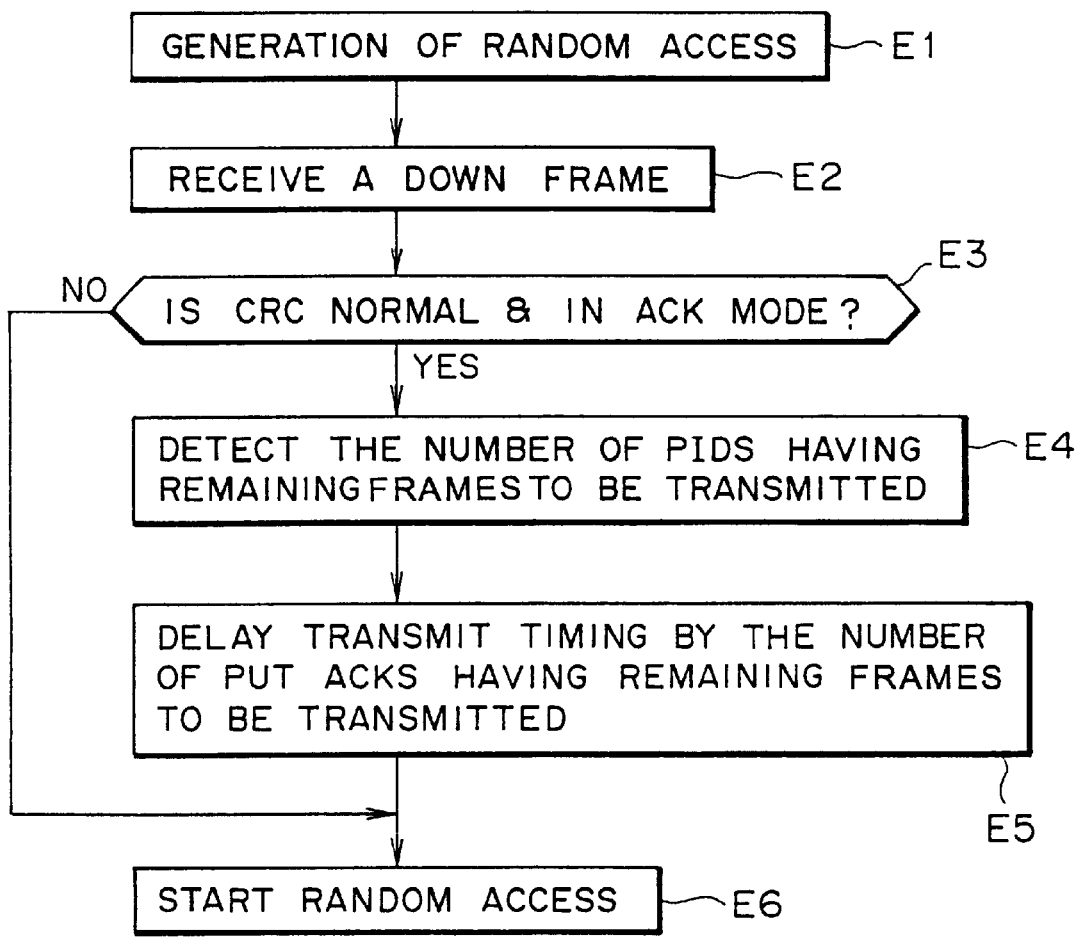
FIG. 17 is a flowchart illustrating an operation of an MS according to the fifth modification of the first embodiment of this invention.

To the contrary, when there occurs a random access process by the MS 6A in cycle T5-2 (Step E1), the MS 6A receives a frame transmitted from the BS 1B (Step E2), as shown in FIG. 17.

The MS 6A performs CRC check on the received frame to determine whether or not the CRC check is normal, and also determines whether or not the received frame is in ACK mode (Step E3).

When the CRC check on the received frame is not normal or the received frame (down) is not in ACK mode, the MS 6A starts a random access (from NO route at Step E3 to Step E6).

When the CRC check is normal and the received frame is in ACK mode [when the received frame is a frame (down) 3], the MS 6A detects the second ACK information "N" from the received frame (down) 3 (from YES route at Step E3 to Step E4), and sets a transmit timing so as to delay the transmit timing by the second ACK information "N" (Step E5). The MS 6A then starts a random access when the set transmit timing comes (Step E6).

The MS 6A receives a frame (down) 3 in cycle T5-3 shown in FIG. 16(b) (Step E2), performs processes of confirmation and the like on received contents in cycle T5-4 (Steps E3 and E4), delays a random access by the second ACK information "N" [denoted as T5d in FIG. 16(b)] in cycle T5-5 since the second ACK information "N" put in the frame (down) 3 is "2", and starts the random access at/after timing T5s.

Namely, the MS 6A randomly selects an access timing among timings after timing T5S, and transmits a frame (up) 2 to the BS 1B.

The CDMA communicating system 1-5 according to the fifth modification of the first embodiment brings the similar effects to the CDMA communicating system 1 according to the first embodiment. In addition, the BS 1B transmits a frame (down) 3 in which acknowledge information rearranged in a predetermined order of priority is put to the MSs 1A through 3A, so that an access time of the MS 1A or the like transmitting information (a plurality of frames) is shortened.

Further, the BS 1B puts the second ACK information "N" showing the number of MSs intending to transmit remaining information along with acknowledge information in a frame (down) 3 and transmits the frame (down) 3 to the MSs 1A through nA, while the MS 6A or the like receives the frame (down) 3 before randomly accessing in the first time to the BS 1B, shifts a transmit timing by the number of "N" of the second ACK information put in the received frame (down) 3 and has a random access. Whereby, it is possible to avoid conflict between the MS 6A first accessing to the BS 1B and the MSs 1A and 2A continuously transmitting frames (up) 2, which suppresses a decrease of the throughput.

(b7) Description of a Sixth Modification of the First Embodiment

According to a sixth modification of the first embodiment, the BS 1B and the MS 1A through nA have similar functions to those described in the first embodiment. However, in a CDMA communicating system (denoted by a different reference character in order to discriminate it from the above CDMA communicating system 1-2) 1-6 according to the sixth modification, when the number "M (M: an integer not less than 1)" of pieces of acknowledge information for MSs intending to continuously transmit frames (up) 2 among plural pieces of acknowledge information rearranged in the order of priority exceeds a maximum number 4 that is accessible in one cycle, excess acknowledge information is put in the next transmission frame (down) 3 and transmitted, dissimilarly to the CDMA communicating system 1-2 according to the second modification of the first embodiment.

Incidentally, like reference characters designate like or corresponding parts in the second modification of the first embodiment.

The BS 1B determines priorities of acknowledge information to frames (up) 2 from the MSs 1A through nA according to a predetermined order of priority, and counts the number "M" of pieces of acknowledge information for MSs intending to continuously transmit frames (up) 2. When the counted number "M" exceeds "4", the BS 1B puts excess acknowledge information in the next frame (down) 3 and transmits the frame (down) 3.

For example, when continuation bits W put in frames (up) 2 transmitted from the MSs 1A through nA are in the bit structure shown in Table 1 above, the BS 1B sets the priority of a frame (up) 2 whose continuation bits W are "00" or "10" to "1", counts up the number "M" of MSs intending to continuously transmit frames (up) 2, sets the priority of a frame (up) 2 whose continuation bits W are "01" or "11" to "3", and rearranges the acknowledge information to be put in a frame (down) 3 in the order of priority.

The CPU 40-1 (refer to FIG. 5) rearranges acknowledge information in the order of preference.

Hereinafter, an operation of the CDMA communicating system 1-6 according to the sixth modification of the first embodiment will be described with reference to time charts shown in FIGS. 19(a) and 19(b) and FIG. 20.

In the CDMA communicating system 1-6 with the above structure according to the sixth modification of the first embodiment, each of the MSs 1A through nA selects an access timing among four access timings in a cycle when transmitting a frame (up) 2, and transmits the frame (up) 2 at the selected timing.

The following description will be made on the assumption that the MSs 1A through 7A transmit frames (up) 2 at different access timings in cycles T6-1 and T6-2 shown in FIG. 19(b), wherein continuation bits W of the frames (up) 2 transmitted from the MSs 1A, 2A, 4A, 5A and 7A are "10", while continuation bits W of the frames (up) 2 transmitted from the MSs 3A and 6A are "11", and the BS 1B receives the frames (up) 2 outputted from the MSs 1A through 7A, puts acknowledge information in one frame (down) 3 and transmits the frame (down) 3.

After the BS 1B starts a process of transmitting a frame (down) 3 (Step F1), the BS 1B updates the number "M" of MSs intending to continuously transmit frames (up) 2 to "0+m" (Step F2). When receiving a frame (up) 2 (Step F3), the BS 1B performs CRC check and determines whether or not a result of the check is normal (Step F4).

When a result of the check is not normal, the BS 1B determines whether or not now is a timing to transmit a frame (down) 3 (from NO route at Step F4 to Step F11).

When a result of the CRC check is normal, the BS 1B detects continuation bits W (from YES route at Step F4 to Step F5), and determines on the basis of the detected continuation bits W whether or not there is a frame (up) 2 to be continuously received (Step F6).

When determining that there is not a frame (up) 2 to be continuously received, the BS 1B sets the priority to "3"

(from NO route at Step F6 to Step F9). To the contrary, when determining that there is a frame (up) 2 to be continuously received, the BS 1B counts up the number "M" of MSs intending to continuously transmit frames (up) 2 (from YES route at Step F6 to Step F7), sets the priority to "1" (Step F8), and stores the priority and a PID thereof (from Step F8 or Step F9 to Step F10).

For example, since continuation bits W of frames transmitted from the MSs 1A, 2A, 4A, 5A and 7A in cycles T6-1 and T6-2 are "10", the BS 1B counts the number "M" of MSs intending to continuously transmit frames (up) 2 as "5" when performing a process of putting acknowledge information to the frame (up) 2 transmitted from the MS 7A.

The BS 1B then determines whether or not now is a timing to transmit a frame (down) 3. (from NO route at Step F4 or Step F10 to Step F11. When now is not a transmit timing, the BS 1B repeats the above process (from NO route at Step F11 to Step F3) until a transmit timing comes (until determined YES at Step F11).

When determining that now is a transmit timing, the BS 1B further determines whether or not there is acknowledge information to be transmitted (from YES route at Step F11 to Step F12) When there is not acknowledge information, the BS 1B repeats the above process (from NO route at Step F12 to Step F3) until determining that there is acknowledge information to be transmitted (until determined YES at Step F12). When there is acknowledge information to be transmitted, the BS 1B determines whether or not the number "M" of MSs intending to continuously transmit frames (up) 2 exceeds "4" (from YES route at Step F12 to Step F13).

When the number "M" of MSs intending to continuously transmit frames (up) 2 does not exceeds "4", the BS 1B rearranges the acknowledge information in the order of priority, and puts the acknowledge information in the current transmission frame (down) 3 (from NO route at Step F13 to Step F15) When the number "M" exceeds "4", the BS 1B stores the excess information along with "m (m=M−4)" in order to put acknowledge information for the excess MSs, separately from PIDs and the like for current transmission (from YES route at Step F13 to Step F14), and puts the acknowledge information in the order of priority in the current transmission frame (down) 3 to be now transmitted (from Step F14 to Step F15).

The BS 1B transmits the frame (down) 3 (Step F16), and clears the information stored for the current transmission (Step F17). Meanwhile, after transmitting the frame (down) 3, the BS 1B performs a process and the like to update the number "M" of MSs intending to continuously transmit frames (up) 2 to "0+m" (from Step F17 to Step F2)

Figure 19:
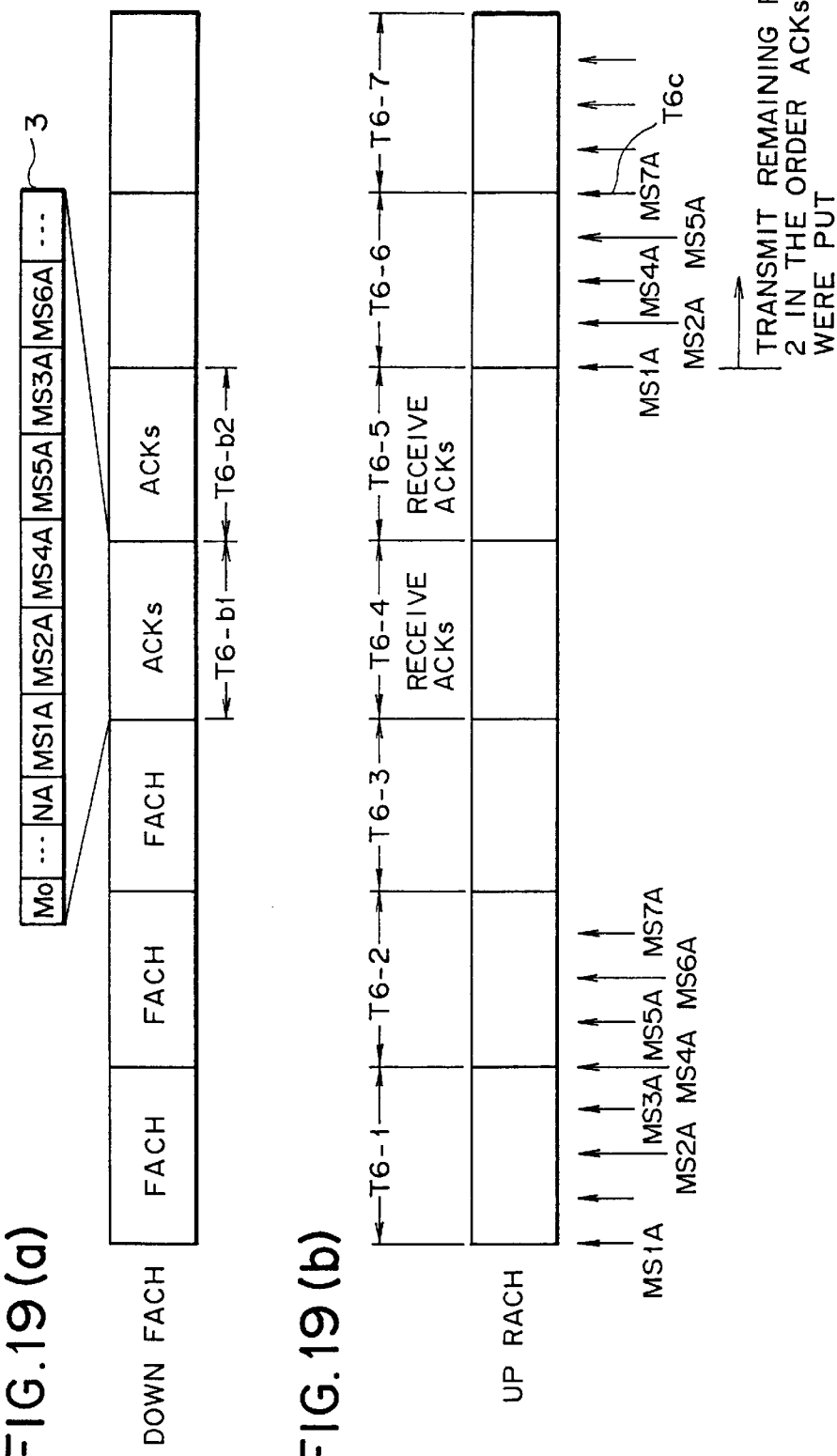
FIGS. 19(a) and 19(b) are time charts illustrating an operation of a CDMA communicating system according to a sixth modification of the first embodiment of this invention.
Figure 20:
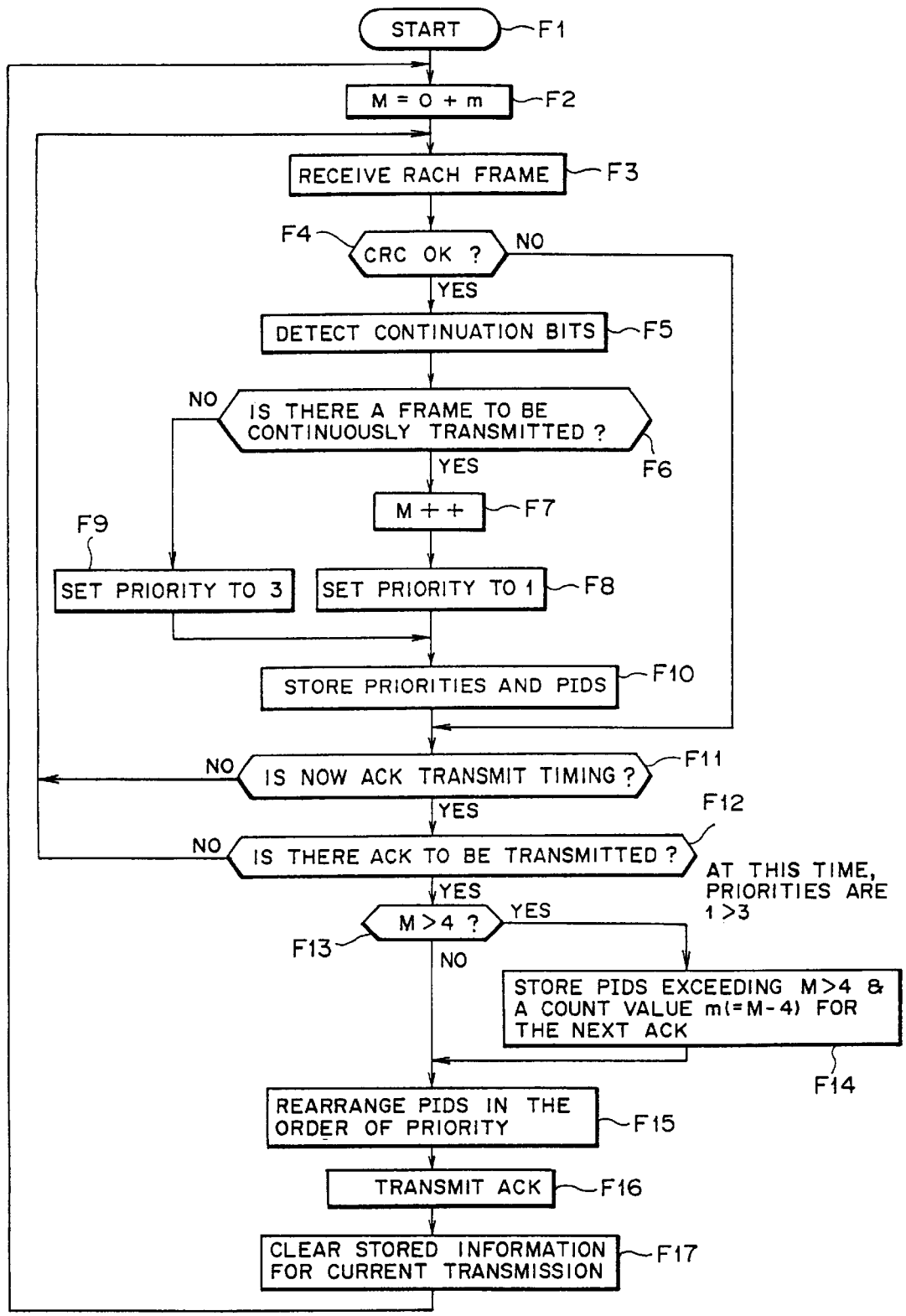
FIG. 20 is a flowchart illustrating an operation of a BS according to the sixth modification of the first embodiment of this invention.

For example, in a transmitting process in response to frames (up) 2 transmitted from the MSs 1A through 7A, acknowledge information for the MS 7A that is an excess generated when the number "M" of MSs intending to continuously transmit frames (up) 2 exceeds "4" is not put in a frame (down) 3 transmitted at timing T6-b1 in FIG. 19(a), but separately stored, put in a frame (down) 3 transmitted in the next timing T6-b2 and transmitted.

After transmitting the frame (down) 3 at timing T6-b1, the BS 1B updates the number "5" of MSs intending to continuously transmit frames (up) 2 to "1" (from Step F17 to Step F2). When receiving a frame (up) 2, the BS 1B repeats similar processes to the above (Steps F3 through F10).

When a desired transmit timing comes (when determined YES at Step F11), the BS 1B determines the number of pieces of acknowledge information to frames (2) transmitted from the MS 7A and the like to be put in a frame (down) 3 on the basis of the number "M" of MSs intending to continuously transmit frames (up) 2 (Steps F13 and F14), puts the acknowledge information in the order of priority in the frame (down) 3, and transmits the frame (down) 3 (Steps F15 through F17)

The MSs 1A, 2A, 4A and 5A receiving the frame (down) 3 transmitted at timing T6-b1 in FIG. 19(a) continuously transmit frames (up) 2 in cycle T6-6 shown in FIG. 19(b) in the order the acknowledge information rearranged in the order of priority in the BS 1B was put when continuously transmitting the frames (up) 2. The MS 7A receives the frame (down) 3 transmitted at timing T6-b2 in FIG. 19(a), and continuously transmits a frame (up) 2 in cycle T6-7 in FIG. 19(b) according to an order of acknowledge information for itself rearranged in the order of priority in the BS 1B.

As above, the CDMA communicating system 1-6 according to the sixth modification of the first embodiment brings the similar effects to the CDMA communicating system 1-2 according to the second modification. In addition, when the number "M" of pieces of acknowledge information for MSs intending to continuously transmit frames (up) 2 exceeds "4", the BS 1B transmits excess acknowledge information generated when the number "M" exceeds "4" at timing T6-b2 in FIG. 19(a). For example, acknowledge information, the number of pieces of which do not exceed the number of access timings in one cycle, for MSs intending to continuously transmit frames (up) 2 is put in a frame (down) 3, the frame (down) 3 is transmitted at timing T6-b1 in FIG. 19(a), and another frame (down) 3 in which the excess acknowledge information for the MSs intending to continuously transmit frames (up) 2 is transmitted in the next timing. It is thereby possible to avoid conflict of accesses by MSs continuously transmitting frames at timing T6c in cycle T6-7 in FIG. 19(b), thus suppress a decrease of the throughput.

(b8) Description of a Seventh Modification of the First Embodiment

According to a seventh modification of the first embodiment, the BS 1B and the MSs 1A through nA have similar functions as those described in the first embodiment. However, in a CDMA communicating system (denoted by a different reference character in order to discriminate it from the above CDMA communicating system 1) 1-7 according to the seventh modification, spectrum spread signals obtained by using spreading codes in two systems are transmitted/received between the BS 1B and the MSs 1A through nA, dissimilarly to the CDMA communicating system 1 according to the first embodiment. Incidentally, like reference characters designate like or corresponding parts in the first embodiment.

Each of the terminals MS 1A through nA uses either one of two types of spreading codes (#1 and #2). In addition, each of the MSs 1A through nA continuously transmits a remaining frame (up) 2 according to an order of acknowledge information for a spreading code (#1 or #2) used by itself separately put in a frame (down) 3.

Each of the terminals MSs 1A through nA determines an order to transmit a remaining frame (up) 2 on the basis of number information "L" (hereinafter, referred to as the third ACK information) on acknowledge information for MSs having transmitted signals using a spreading code #1 to be described later put in a frame (down) 3 received from the BS 1B. In concrete, the CPU 40 (refer to FIG. 4) makes the above determination.

The following description will be made on the assumption that the MSs 1A and 4A transmit spread spectrum signals obtained using the spreading code #1, while the MSs 2A, 3A and 5A transmit spread spectrum signals obtained using a spreading code #2. Namely, the MSs 1A and 4A each configures a first terminal apparatus transmitting spread spectrum signals obtained using the spreading code #1 between two different types of spreading codes #1 and #2 to the BS 1B, while the MSs 2A, 3A and 5A each configures a second terminal apparatus transmitting spread spectrum signals obtained using the other spreading code #2 between two types of spreading codes #1 and #2 to the BS 1B.

The BS 1B separately puts acknowledge information for each of the spreading codes #1 and #2 in a frame (down) 3 along with the third ACK information "L", and transmits the frame (down) 3.

Incidentally, it is possible to replace "NA" with the third ACK information "L" in the ACK format shown in FIG. 3(a), for example, to form a frame (down) 3.

The BS 1B receives spread spectrum signals obtained using the spreading codes #1 and #2 and performs a de-spreading process using the spreading codes #1 and #2 having desired phases. For this, the BS 1B includes a plurality of de-spreading units 16-1 through 16-4 for each of the spreading codes #1 and #2, dissimilarly to the above receiving unit 10-1 (FIG. 5).

The following description will be made on the assumption that the BS 1B transmits a frame (down) 3 in which "NA" is replaced with the third ACK information "L".

To the above end, the BS 1B separately counts the numbers "L" and "P" of pieces of acknowledge information for respective spreading codes #1 and #2 and holds the numbers when putting the acknowledge information to frames (up) 2 transmitted using the spreading codes #1 and #2.

The CPU 40-1 (refer to FIG. 5) performs the above counting for each of the spreading codes #1 and #2, or a process of putting acknowledge information in a frame (down) 3.

Next, an operation of the CDMA communicating system 1-7 according to the seventh modification of the first embodiment will be described with reference to time charts in FIGS. 21(a) and 21(b), and FIGS. 22 and 23.

In the CDMA communicating system 1-7 having the above structure according to the seventh modification of the first embodiment, each of the MSs 1A through nA selects an access timing among four access timings in a cycle when transmitting a frame (up) 2, and transmits the frame (up) 2 at the selected timing.

The following description will be made on the assumption that, in cycle T7-1 shown in FIG. 21(b), the MSs 1A and 4A transmit frames (up) 2 using the spreading code #1 having different phases at different access timings, while the MSs 2A, 3A and 5A transmit frames (up) 2 using the spreading code #2 having different phases at different access timings, and the BS 1B receives the frames (up) 2 outputted from the MSs 1A through 5A, and performs a process of putting acknowledge information in a frame (down) 3 to transmit the same.

Figure 22:
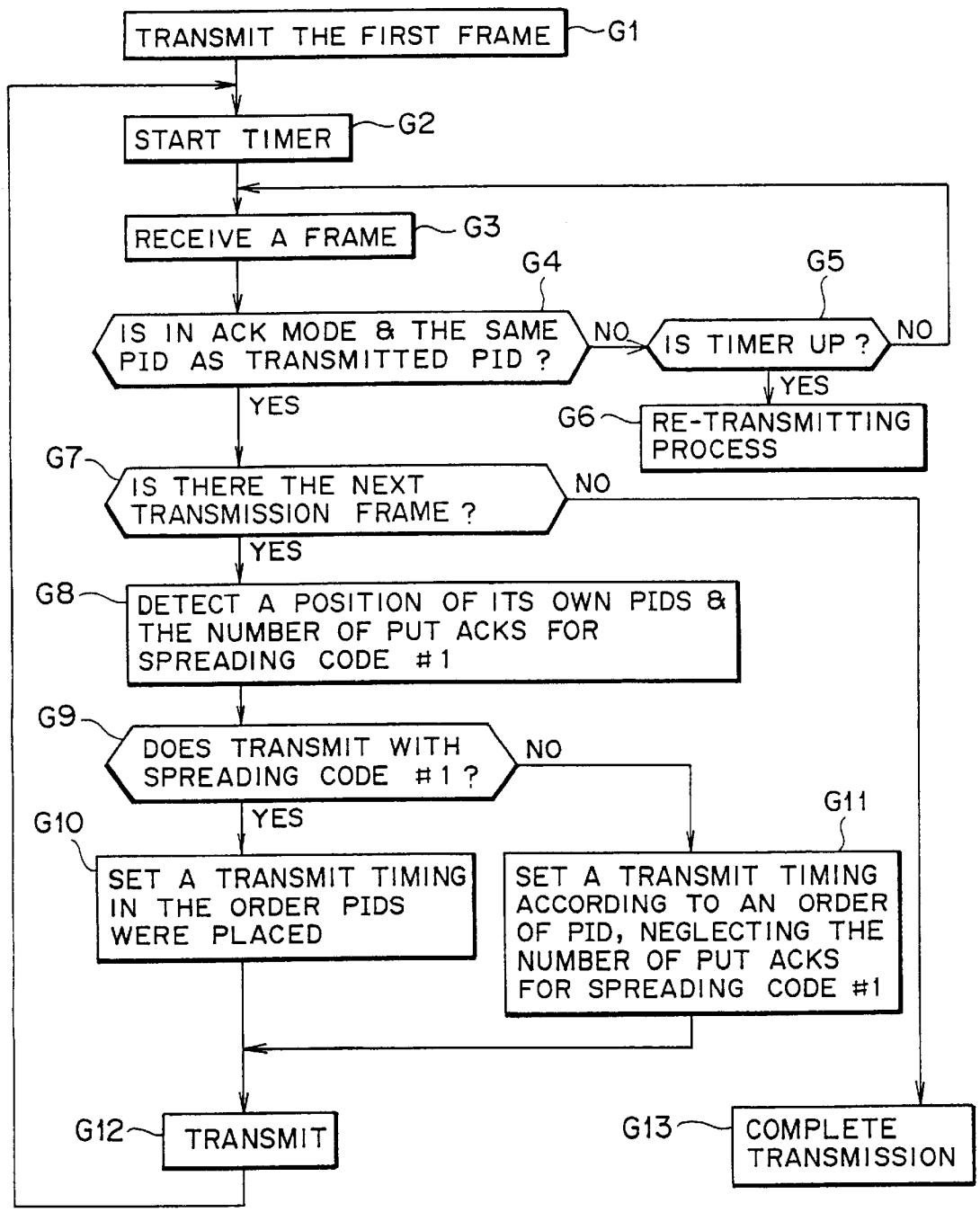
FIG. 22 is a flowchart illustrating an operation of an MS according to the seventh modification of the first embodiment of this invention.

Each of the MSs 1A through 5A starts the timer after transmitting a frame (up) 2 (Step G1 in FIG. 22).

Figure 23:
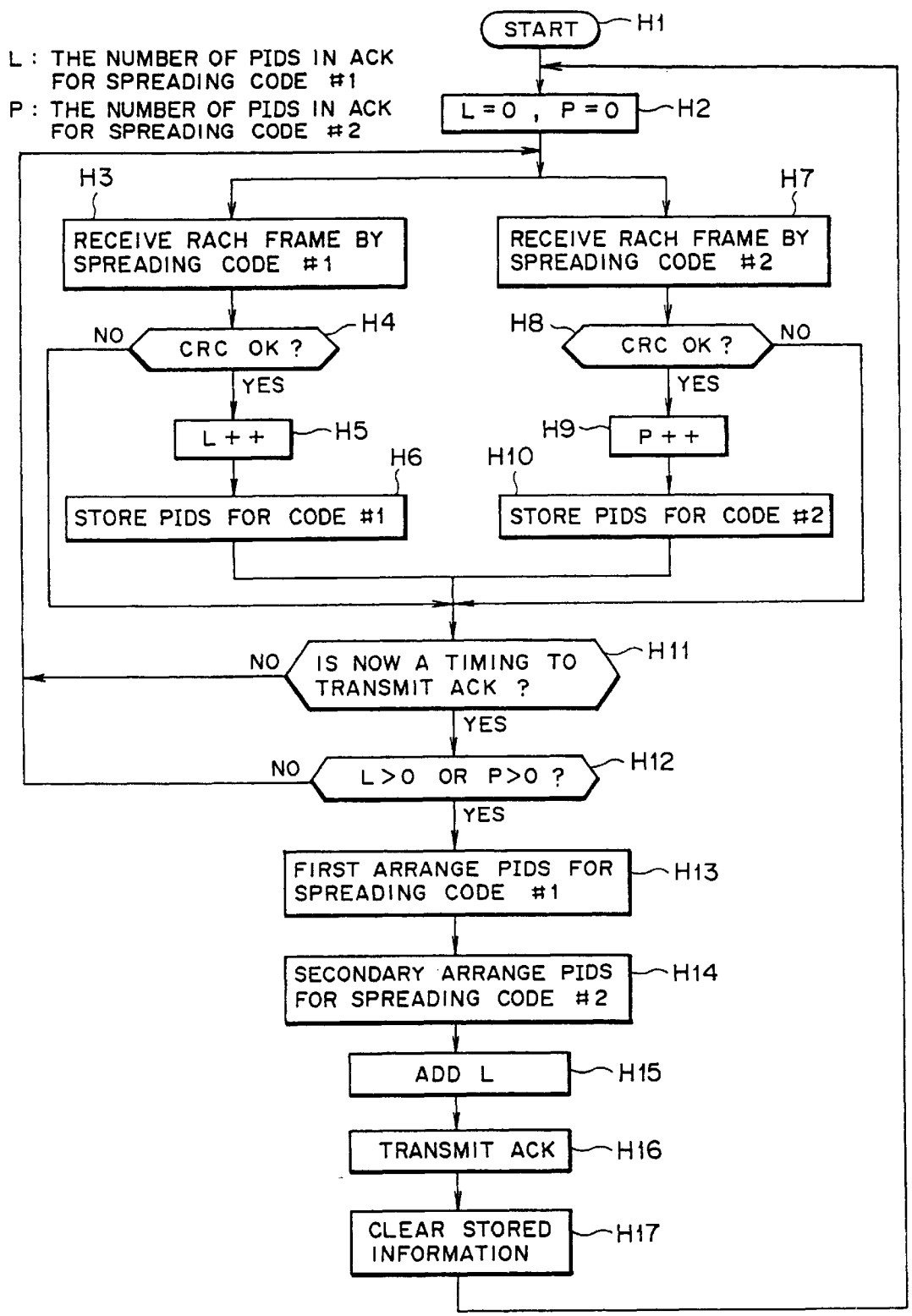
FIG. 23 is a flowchart illustrating an operation of a BS according to the seventh modification of the first embodiment of this invention.

As shown in FIG. 23, after the BS 1B starts a process of transmitting a frame (down) 3 (Step H1), the BS 1B clears count values of "L" and "P" (step H2)

When the BS 1B receives a frame (up) 2 of the spreading code #1 (Step H3), the BS 1B performs CRC check, and determines whether or not a result of the check is normal (Step H4).

When a result of the CRC check on the received frame (up) 2 is not normal, the BS 1B determines whether or not now is a timing to transmit acknowledge information (from NO route at Step H4 to Step H11). When a result of the CRC check is normal, the BS 1B counts up the number information "L" (the third ACK information) on acknowledge information for MSs having transmitted signals using the spreading code #1 (from YES route at Step H4 to Step H5), stores PIDs for the spreading code #1 (Step H6), and determines whether or not now is a timing to transmit acknowledge information (Step H11).

When the BS 1B receives a frame (up) 2 of the spreading code #2 (Step H7), the BS 1B performs CRC check, and determines whether or not a result of the check is normal (Step H8).

When a result of the CRC check on the received frame (up) 2 is not normal, the BS 1B determines whether or not now is a timing to transmit acknowledge information (from NO route at Step H8 to Step H11). When a result of the CRC check on the received frame (up) 2 is normal, the BS 1B counts up number information "P" on acknowledge information for MSs having transmitted signals using the spreading code #2 (from YES route at Step H8 to Step H9), stores PIDs for the spreading code #2 (Step H10), and determines whether or not now is a timing to transmit the acknowledge information (Step H11).

When now is not a timing to transmit the acknowledge information, the BS 1B repeats the above process (Steps H3 through H6 or Steps H7 through H10) until determining that now is a timing to transmit the acknowledge information (until determined YES at Step H11).

When now is a timing to transmit the acknowledge information, the BS 1B determines whether or not a count value of "L" or "P" is larger than "0" (from YES route at Step H11 to Step H12). When counts of "L" and "P" are both "0", the BS 1B repeats the above process (from NO route at Step H12 to Step H3 or H7).

When a count of "L" or "P" is larger than "0", the BS 1B arranges first acknowledge information for the code #1 in the lead (from YES route at Step H12 to Step H13), then arranges acknowledge information for the code #2 following the acknowledge information for the code #1 (Step H14), and puts the acknowledge information along with the third ACK information "L" in a frame (down) 3 (Step H15).

After that, the BS 1B transmits the frame (down) 3 (Step H16), and clears information used to put the acknowledge information and the like in the frame (down) 3 (Step H17).

Thereafter, the BS 1B performs the above process whenever receiving a frame (up) 2 (from Step H17 to Step H2).

Figures 21A, 21B:
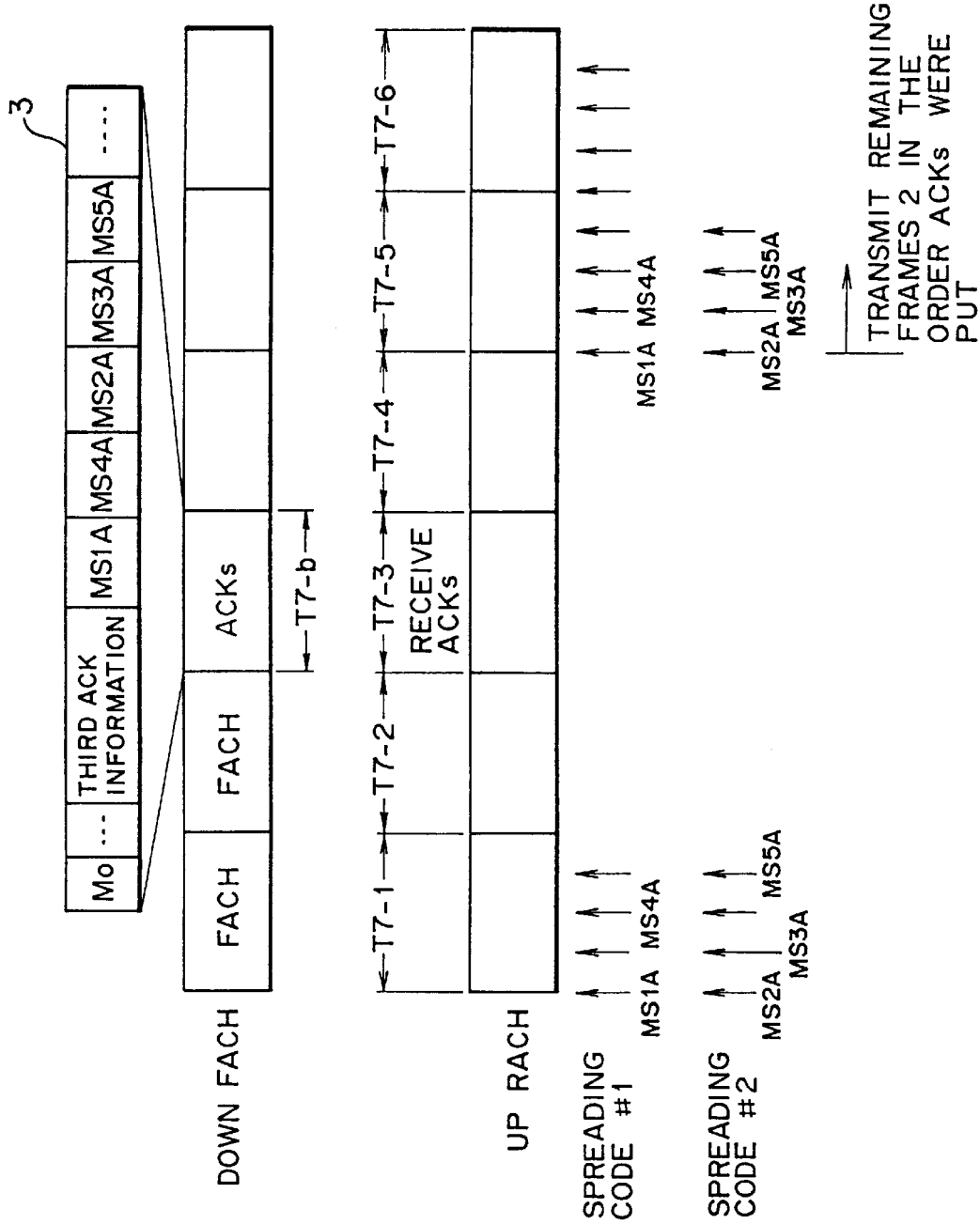
FIGS. 21(a) and 21(b) are time charts illustrating an operation of a CDMA communicating system according to a seventh modification of the first embodiment of this invention.

As shown in FIG. 21(a), for example, the BS 1B first arranges acknowledge information for the MSs 1A and 4A having transmitted using the spreading code #1 in the lead, secondary separately arranges acknowledge information for the MSs 2A, 3A and 5A having transmitted signals using the spreading code #2 in order, and puts the acknowledge information in a frame (down) 3 along with the third ACK information "L" (=2) showing the number of pieces of acknowledge information for the MSs 1A and 4A having transmitted signals using the spreading code #1. The BS 1B transmits the frame (down) 3 when a desired transmit timing comes [timing T7-b in FIG. 21(a), for example] and the timer is started (Step G2).

Each of the MSs 1A through 5A receives the frame (down) 3 transmitted from the BS 1B in cycle T7-b (Step G3) and determines in cycle T7-4 whether or not the frame (down) 3 is in ACK mode and has the same PID as a PID having been transmitted from itself (Step G4)

When the frame received from the BS 1B is not in ACK mode or the PID does not coincide with the PID having been transmitted, the MS determines whether or not the started timer is up (from NO route at Step G4 to Step G5). When the timer has counted up to the maximum value, the MS performs a re-transmitting process (from YES route at Step G5 to Step G6). When the timer is not up, the MS moves to a process of receiving a frame (from NO route at Step G5 to Step G3).

Incidentally, a count value of the timer is cleared when a transmitted PID is detected from a received frame (down) 3.

When the PID is the same as the PID having been transmitted, each of the MSs 1A through 5A determines whether or not there is a remaining frame (up) 2 to be continuously transmitted (from YES route at Step G4 to Step G7) When there is not a remaining frame (up) 2, the MS completes the transmission (from NO route at Step G7 to Step G13).

When there is a remaining frame (up) 2, each of the MSs 1A through 5A detects a position of a PID of its own among plural pieces of acknowledge information and the third ACK information "L" put in the received frame (down) 3 (from YES route at Step G7 to Step G8).

Each of the MSs 1A through 5A then determines whether or not itself has transmitted using the code #1 (Step G9). If the MS has transmitted the frame (up) 2 using the code #1, the MS sets a timing to continuously transmit the remaining frame (up) 2 according to an order of acknowledge information for itself put in the frame (down) 3 (from YES route at Step G9 to Step G10).

If the MS has transmitted using the code #2, each of the MSs 2A, 3A and 5A, for example, sets a timing to transmit a remaining frame (up) 2 to be continuously transmitted using the third ACK information "L" (from NO route at Step G9 to Step G11). Namely, each of the MSs 2A, 3A and 5A neglects acknowledge information corresponding to a value of the third ACK information put in the frame received from the BS 1B, and sets a timing to transmit a frame (up) 2 to be continuously transmitted according to an order of put acknowledge information for itself.

Each of the MSs 1A through 5A transmits spread spectrum signals obtained using the code (#1 or #2) when a desired access timing set comes (Step G12).

In FIG. 21(b), the MSs 1A and 4A spectrum-spread remaining frames (up) 2 using the spreading code #1 having different phases, and transmit the frames (up) 2 at access timings in cycle T7-5 in the order acknowledge information was put in a received frame (down) 3. The MSs 2A, 3A and 5A spectrum-spread remaining frames (up) 2 using the spreading code #2 having different phases, and transmit the frames (up) 2 at access timings in the order acknowledge information other than acknowledge information corresponding to the third ACK information "L" (=2) was put in the received frame (down) 3.

After that, each of the MSs 1A through 5A performs the above process on a frame (up) 2 to be continuously transmitted (Step G12 to Step G2).

In the CDMA communicating system 1-7 according to the seventh modification of the first embodiment, the BS 1B puts the third ACK information "L" along with acknowledge information in a frame (down) 3 and transmits the same, so that each of the MSs 1A through 5A finds a position of acknowledge information to a frame (up) 2 having been transmitted from itself using its own spreading code (#1 or #2) among plural pieces of acknowledge information put in the frame (down) 3 on the basis of the third ACK information "L". It is thereby possible to avoid conflict of access timings at which remaining frames (up) 2 are continuously transmitted even in the CDMA communication using two types of spreading codes (#1 and #2), thus suppress a decrease of the throughput.

(b9) Others

As having been described the present invention, the present invention is not limited to the above examples, but may be modified in various ways without departing from the scope of the invention.

What is claimed is:

1. A code division multiple access communicating system equipped with a base station and a plurality of terminal apparatus exchanging spread spectrum information with said base station over a commonly used channel when communicating with said base station, comprising:

said base station including:
a receiving means for receiving an access signal from each of said plural terminal apparatus at the time of random access from each of said plural terminal apparatus;
an acknowledge information; transmitting means, for collectively putting plural pieces of acknowledge information, each of which is an information to acknowledge reception of said access signals for said plural terminal apparatus, respectively, in a transmission frame when said receiving means receives the access signals from said plural terminal apparatus, and transmitting said frame to said plural terminal apparatus;

each of said plural terminal apparatus comprising:
an acknowledge information receiving means for receiving said plural pieces of acknowledge information in said frame transmitted from said acknowledge information within said transmission frame transmitting means of said base station; and
a transmitting means for again accessing and transmitting a remaining information to said base station according to an order of acknowledge information for its own terminal apparatus among said plural pieces of acknowledge information received by said acknowledge information receiving means after randomly accessing to said base station when there is said remaining information to be continuously transmitted to said base station.

2. The code division multiple access communicating system according to claim 1, wherein said transmitting means of each of said plural terminal apparatus again accesses to the base station in a period of transmit timing set according to said order of acknowledge information for its own terminal apparatus when continuously transmitting said remaining information to said base station, and transmitting said remaining information.

3. The code division multiple access communicating system according to the claim 1, wherein said acknowledge information transmitting means of said base station transmits said transmission frame, in which plural pieces of acknowledge information rearranged in a predetermined order of priority have been put, to said plural terminal apparatus.

4. The code division multiple access communicating system according to claim 1, wherein said acknowledge information transmitting means of said base station transmits said transmission frame, in which plural pieces of acknowledge information rearranged in a predetermined order of priority have been put, to said plural terminal apparatus; and wherein said transmitting means of each of said plural terminal apparatus again accesses to said base station in a period of transmit timing set according to said order of acknowledge information for its own terminal apparatus when continuously transmitting said remaining information to said base station, and transmits said remaining information.

5. The code division multiple access communicating system according to claim 1, wherein each of said plural terminal apparatus receives said transmission frame by said acknowledge information receiving means before first randomly accessing to said base station, and each of said terminal apparatus further comprises a means for delaying a transmit timing by the number of pieces of said acknowledge information put in said received transmission frame to randomly access to said base station.

6. The code division multiple access communicating system according to claim 1, wherein said acknowledge information transmitting means of said base station puts information showing the number of terminal apparatus intending to transmit remaining information along with said acknowledge information in said transmission frame, and transmits said transmission frame to said plural terminal apparatus; and wherein each of said terminal apparatus receives said transmission frame by said acknowledge information receiving means before first randomly accessing to said base station, and further comprises a means for delaying a transmit timing by the number of terminal apparatus intending to transmit remaining information shown by said information put in said received transmission frame to randomly access to said base station.

7. The code division multiple access communicating system according to claim 1, wherein said acknowledge information transmitting means of said base station transmits a transmission frame in which said plural pieces of acknowledge information rearranged in the order in which terminal apparatus intending to transmit remaining information should access to said base station to said plural terminal apparatus; and wherein when the number of pieces of said acknowledge information for said terminal apparatus intending to transmit said remaining information exceeds the number of transmit timings within a predetermined range in which said plural terminal apparatus access, said acknowledge information transmitting means puts excess acknowledge information in a transmission frame to be transmitted in the next occasion.

8. The code division multiple access communicating system according to claim 1, wherein said plural terminal apparatus are classified into a first terminal apparatus for transmitting spread spectrum information obtained using either one of at least two different types of spreading information to said base station, and a second terminal apparatus for transmitting spread spectrum information obtained using at least the other one of said two different types of spreading information to said base station;

wherein said acknowledge information transmitting means of said base station separately puts said acknowledge information for each type of said spreading information, puts number information on the number of pieces of acknowledge information for said first terminal apparatus having transmitted said information obtained using said former spreading information or number information on the number of pieces of acknowledge information for said second terminal apparatus having transmitted said information obtained using said latter spreading information along with said acknowledge information in said transmission frame, and transmits said transmission frame to said plural terminal apparatus; and wherein said transmitting means of said first terminal apparatus or said second terminal apparatus transmits said remaining information according to an said order of acknowledge information for its own terminal apparatus among said acknowledge information for spreading information used by its own terminal apparatus separately put in said transmission frame.

9. A base station for a code division multiple access communicating system exchanging spread spectrum information with a plurality of terminal apparatus over a commonly used channel, comprising:

a receiving means for receiving an access signal from each of said plural terminal apparatus at the time of random access from each of said plural terminal apparatus; and an acknowledge information transmitting means for collectively putting plural pieces of acknowledge information, each of which is an information to acknowledge reception of said access signals for said plural terminal apparatus, respectively in a transmission frame in the order said access signals were received from said plural terminal apparatus when receiving said access signals from said plural terminal apparatus by said receiving means, and transmitting said transmission frame to said plural terminal apparatus so that said plural terminal apparatus having remaining information to be continuously transmitted to said base station again access to said base station in a predetermined order to transmit said remaining information.

10. The base station for a code division multiple access communicating system according to claim 9, wherein said acknowledge information transmitting means transmits said transmission frame, in which plural pieces of acknowledge information rearranged in the order of priority are put, to said plural terminal apparatus.

11. The base station for a code division multiple access communicating system according to claim 9, wherein said acknowledge information transmitting means puts information showing the number of terminal apparatus intending to transmit remaining information along with said acknowledge information in said transmission frame, and transmit said frame to said plural terminal apparatus.

12. The base station for a code division multiple access communicating system according to claim 9, wherein said acknowledge information transmitting means transmits a transmission frame, in which plural pieces of said acknowledge information rearranged in the order in which terminal apparatus intending to transmit remaining information should access to said base station have been put, to said plural terminal apparatus; and wherein when the number of pieces of said acknowledge information for said terminal apparatus intending to transmit remaining information exceeds the number of transmit timings within a predetermined range in which said plural terminal apparatus access, said acknowledge information transmitting means puts excess acknowledge information in a transmission frame to be transmitted in the next occasion.

13. The base station for a code division multiple access communicating system according to claim 9, wherein said acknowledge information transmitting means separately puts said acknowledge information for each of at least two different types of spreading information in said transmission frame, puts number information on the number of pieces of acknowledge information for first terminal apparatus having transmitted spread spectrum information obtained using one of said two different types of spreading information among said plural terminal apparatus, or number information on the number of pieces of said acknowledge information for second terminal apparatus having transmitted spread spectrum information obtained using the other one of said at least two different types of said spreading information among said plural terminal apparatus along with said acknowledge information in said transmission frame, and transmits said transmission frame to said plural terminal apparatus.

14. A terminal apparatus for a code division multiple access communication system exchanging spread spectrum information with a base station over a commonly used channel when communicating with said base station in said code division multiple access communication system, said terminal apparatus comprising:

a randomly accessing means for randomly accessing to said base station;

an acknowledge information receiving means for receiving plural pieces of acknowledge information in a transmission frame transmitted from said base station, said base station collectively putting acknowledge information for said terminal apparatus along with acknowledge information for other terminal apparatus in said transmission frame, and transmitting said transmission frame to said terminal apparatus when receiving an access signal from said terminal apparatus at the time of random access by said terminal apparatus to said base station; and a transmitting means for again accessing and transmitting a remaining information to said base station according to an order of said acknowledge information for the terminal apparatus of its own among said plural pieces of acknowledge information in said transmission frame received by said acknowledge information receiving means after said terminal apparatus randomly accesses to said base station if there is said remaining information to be continuously transmitted to said base station.

15. The terminal apparatus for a code division multiple access communicating system according to claim 14, wherein said transmitting means again accesses to said base station in a set period of transmit timing set according to said order of acknowledge information for its own terminal apparatus when transmitting said remaining information to said base station, and transmits said remaining information.

16. The terminal apparatus for a code division multiple access communicating system according to claim 14, wherein said acknowledge information receiving means receives said transmission frame before said terminal apparatus first randomly accesses to said base station, and said terminal apparatus further comprises a means for delaying a transmit timing by the number of pieces of said acknowledge information put in said received transmission frame to randomly access to said base station.

17. The terminal apparatus for a code division multiple access communicating system according to claim 14, wherein said acknowledge information receiving means receives a transmission frame in which information showing the number of terminal apparatus intending to transmit remaining information has been put along with said acknowledge information before said terminal apparatus first randomly accesses to said base station, and said terminal apparatus further comprises a means for delaying a transmit timing by the number of terminal apparatus intending to transmit remaining information put in said received transmission frame to randomly access to said base station.

18. A code division multiple access communicating method in a code division multiple access communicating system comprising a base station and a plurality of terminal apparatus communicating with said base station to exchanged spread spectrum information between said base station and said plural terminal apparatus over a commonly used line, a code division multiple access communicating method comprising the steps of:

an acknowledge information transmitting step performed in said base station of collectively putting plural pieces of acknowledge information for respective said plural terminal apparatus in a transmission frame when said base station receives access signals from said plural terminal apparatus at the time of random accesses from said plural terminal apparatus, and transmitting said transmission frame to said plural terminal apparatus; and a transmitting step performed in each of said plural terminal apparatus of again accessing to said base station according to an order of acknowledge information for itself among said plural pieces of acknowledge information in said transmission frame transmitted from said base station after a random access to said base station if there is said remaining information to be continuously transmitted to said base station to transmit said remaining information.

19. The code division multiple access communicating method according to claim 18, wherein each of said plural terminal apparatus again accesses to said base station in a period of transmit timing set according to an said order of acknowledge information for itself put in said transmission frame when continuously transmitting said remaining information to said base station to transmit said remaining information.

20. The code division multiple access communicating method according to claim 18, wherein said base station transmits said transmission frame, in which plural pieces of acknowledge information rearranged in a predetermined order of priority have been put, to said plural terminal apparatus.

21. The code division multiple access communicating method according to claim 18, wherein said base station transmits said transmission frame in which plural pieces of acknowledge information rearranged in a predetermined order of priority have been put to said plural terminal apparatus; and wherein each said plural terminal apparatus again accesses to said base station in a period of transmit timing set according to said order of acknowledge information for itself put in said transmission frame when continuously transmitting said remaining information to said base station to transmit said remaining information.

22. The code division multiple access communicating method according to claim 18, wherein each of said plural terminal apparatus receives said transmission frame by an acknowledge information receiving means before first randomly accessing to said base station, and delays a transmit timing by the number of pieces of said acknowledge information put in said received transmission frame to randomly access to said base station.

23. The code division multiple access communicating method according to claim 18, wherein said base station puts information on the number of terminal apparatus intending to transmit remaining information along with said acknowledge information in said transmission frame, and transmits said transmission frame to said plural terminal apparatus; and wherein each of said plural terminal apparatus receives said transmission frame before first randomly accessing to said base station, delays a transmit timing by the number of terminal apparatus intending to transmit remaining information put in said received transmission frame to randomly access to said base station.

24. The code division multiple access communicating method according to claim 18, wherein said base station transmits a transmission frame, in which said plural pieces of acknowledge information rearranged in the order in which terminal apparatus intending to transmit remaining information should access to said base station have been put, to said plural terminal apparatus; and wherein when the number of pieces of said acknowledge information for said terminal apparatus intending to transmit remaining information exceeds the number of transmit timings within a predetermined range in which said plural terminal apparatus access, excess acknowledge information is put in a transmission frame to be transmitted in the next occasion.

25. The code division multiple access communicating method according to claim 18, wherein said plural terminal apparatus are classified into a first terminal apparatus for transmitting spread spectrum information obtained using either one of at least two different types of spreading information to said base station, and a second terminal apparatus for transmitting spread spectrum information obtained using the other one of said at least two different types of spreading information to said base station;

wherein said base station separately puts said acknowledge information for each type off said spreading information, puts number information on the number of pieces of said acknowledge information for said first terminal apparatus having transmitted information obtained using said former spreading information, or number information on the number of pieces of acknowledge information for said second terminal apparatus having transmitted said information obtained using said latter spreading information along with said acknowledge information in said transmission frame, and transmits said transmission frame to said plural terminal apparatus; and wherein a transmitting means of each of said first terminal apparatus or said second terminal apparatus transmits said remaining information according to an said order of acknowledge information for its own apparatus among said acknowledge information for spreading information used by its own terminal apparatus separately put in said transmission frame.

26. A code division multiple access communicating system equipped with a base station and a plurality of terminal apparatus exchanging spread spectrum information with said base station over a commonly used channel when communicating with said base station, comprising:

said base station including:
a receiving means for receiving an access signal from each of said plural terminal apparatus at the time of random access from each of said plural terminal apparatus;
an acknowledge information transmitting means, for collectively putting plural pieces of acknowledge information for said plural terminal apparatus in a transmission frame, and transmitting said frame to said plural terminal apparatus when receiving means receives the access signals from said plural terminal apparatus;

each of said plural terminal apparatus comprising;
an acknowledge information receiving means for receiving said plural pieces of acknowledge information from said acknowledge information transmitting means of said base station; and
a transmitting means for again accessing to said base station according to an order of acknowledge information for its own terminal apparatus among said plural pieces of acknowledge information received from said base station by said acknowledge information receiving means after randomly accessing to said base station when there is remaining information to be continuously transmitted to said base station, and transmitting said remaining information;

wherein said plural terminal apparatus are classified into a first terminal apparatus for transmitting spread spectrum information obtained using either one of at least two different types of spread information to said base station, and a second terminal apparatus for transmitting spread spectrum information obtained using at least the other one of said two different types of spreading information to said base station;

wherein said acknowledge information transmitting means of said base station separately puts said acknowledge information for each type of said spreading information, puts number information on the number of pieces of acknowledge information for said first terminal apparatus having transmitted said information obtained using said former spreading information or number information on the number of pieces of acknowledge information for said second terminal apparatus having transmitted said information obtained using said latter spreading information along with said acknowledge information in said transmission frame, and transmits said transmission frame to said plural terminal apparatus; and wherein said transmitting means of said first terminal apparatus or said second terminal apparatus transmits said remaining information according to an order of acknowledge information for its own terminal apparatus among said acknowledge information for spreading information used by its own terminal apparatus separately put in said transmission frame.

27. A base station for a code division multiple access communicating system exchanging spread spectrum information with a plurality of terminal apparatus over a commonly used channel, comprising:

a receiving means for receiving an access signal from each of said plural terminal apparatus at the time of random access from each of said plural terminal apparatus; and an acknowledge information transmitting means for collectively putting plural pieces of acknowledge information for said plural terminal apparatus in a transmission frame in the order said access signals were received from said plural terminal apparatus when receiving said access signals from said plural terminal apparatus by said receiving means, and transmitting said transmission frame to said plural terminal apparatus so that said plural terminal apparatus having remaining information to be continuously transmitted to said base station again access to said base station in a predetermined order to transmit said remaining information;

wherein said acknowledge information transmitting means puts information showing the number of terminal apparatus intending to transmit remaining information along with said acknowledge information in said transmission frame, and transmit said frame to said plural terminal apparatus.

28. A base station for a code division multiple access communicating system exchanging spread spectrum information with a plurality of terminal apparatus over a commonly used channel, comprising:

a receiving means for receiving an access signal from each of said plural terminal apparatus at the time of random access from each of said plural terminal apparatus; and an acknowledge information transmitting means for collectively putting plural pieces of acknowledge information for said plural terminal apparatus in a transmission frame in the order said access signals were received from said plural terminal apparatus when receiving said access signals from said plural terminal apparatus by said receiving means, and transmitting said transmission frame to said plural terminal apparatus so that said plural terminal apparatus having remaining information to be continuously transmitted to said base station again access to said base station in a predetermined order to transmit said remaining information;

wherein said acknowledge information transmitting means separately puts said acknowledge information for each of at least two different types of spreading information in said transmission frame, puts number information on the number of pieces of acknowledge information for first terminal apparatus having transmitted spread spectrum information obtained using one of said two different types of spreading information among said plural terminal apparatus, or number information on the number of pieces of said acknowledge information for second terminal apparatus having transmitted spread spectrum information obtained using the other one of said at least two different types of said spreading information among said plural terminal apparatus along with said acknowledge information in said transmission frame, and transmits said transmission frame to said plural terminal apparatus.

29. A code division multiple access communicating method in a code division multiple access communicating system comprising a base station and a plurality of terminal apparatus communicating with said base station to exchange spread spectrum information between said base station and said plural terminal apparatus over a commonly used line, a code division multiple access communicating method comprising the steps of:

an acknowledge information transmitting step performed in said base station of collectively putting acknowledge information for said plural terminal apparatus in a transmission frame when said base station receives access signals from said plural terminal apparatus at the time of random accesses from said plural terminal apparatus, and transmitting said transmission frame to said plural terminal apparatus; and a transmitting step performed in each of said plural terminal apparatus of again accessing to said base station according to an order of acknowledge information for itself among said plural pieces of acknowledge information received from said base station put in said transmission frame after a random access to said base station if there is said remaining information to be continuously transmitted to said base station to transmit said remaining information;

wherein said plural terminal apparatus are classified into a first terminal apparatus for transmitting spread spectrum information obtained using either one of at least two different types of spreading information to said base station, and a second terminal apparatus for transmitting spread spectrum information obtained using the other one of said at least two different types of spreading information to said base station;

wherein said base station separately puts said acknowledge information for each type of said spreading information, puts number information on the number of pieces of said acknowledge information for said first terminal apparatus having transmitted information obtained using said former spreading information, or number information on the number of pieces of acknowledge information for said second terminal apparatus having transmitted said information obtained using said latter spreading information along with said acknowledge information in said transmission frame, and transmits said transmission frame to said plural terminal apparatus; and wherein a transmitting means of each of said first terminal apparatus or said second terminal apparatus transmits said remaining information according to an order of acknowledge information for its own apparatus among said acknowledge information for spreading information used by its own terminal apparatus separately put in said transmission frame.

* * * * *